(12) United States Patent
Nappa et al.

(10) Patent No.: US 11,478,971 B2
(45) Date of Patent: Oct. 25, 2022

(54) APPARATUS AND METHOD TO ADJUST THE THICKNESS PROFILE IN THE PRODUCTION OF BLOWN FILMS

(71) Applicant: Syncro S.r.l., Busto Arsizio (IT)

(72) Inventors: Enrico Nappa, Induno Olona (IT); Paolo Rizzotti, Novara (IT); Gabriele Caccia, Busto Arsizio (IT)

(73) Assignee: SYNCRO S.R.L., Busto Arsizio (IT)

( * ) Notice: Subject to any disclaimer, the term of this patent is extended or adjusted under 35 U.S.C. 154(b) by 257 days.

(21) Appl. No.: 16/613,589

(22) PCT Filed: May 23, 2018

(86) PCT No.: PCT/IB2018/053649
§ 371 (c)(1),
(2) Date: Nov. 14, 2019

(87) PCT Pub. No.: WO2018/215945
PCT Pub. Date: Nov. 29, 2018

(65) Prior Publication Data
US 2021/0162644 A1 Jun. 3, 2021

(30) Foreign Application Priority Data

May 23, 2017 (IT) .................. 102017000055831

(51) Int. Cl.
*B29C 48/92* (2019.01)
*B29C 48/88* (2019.01)
(Continued)

(52) U.S. Cl.
CPC .......... *B29C 48/92* (2019.02); *B29C 48/0018* (2019.02); *B29C 48/913* (2019.02);
(Continued)

(58) Field of Classification Search
CPC ......... B29C 48/92; B29C 55/28; B29C 48/10; B29C 48/911; B29C 48/9115;
(Continued)

(56) References Cited

U.S. PATENT DOCUMENTS 3,474,160 A * 10/1969 Doering ................. G01B 15/02
425/174
4,209,475 A *  6/1980 Herrington ............. B29C 48/10
425/141

(Continued)

FOREIGN PATENT DOCUMENTS

DE         4218993 C1    7/1993
EP         1284180 A1    2/2003
(Continued)

OTHER PUBLICATIONS

International Search Report and Written Opinion for Corresponding International Application No. PCT/IB2018/053649 (16 Pages) (dated Sep. 24, 2018).

*Primary Examiner* — Jeffrey M Wollschlager
(74) *Attorney, Agent, or Firm* — Lucas & Mercanti, LLP

(57) ABSTRACT

Disclosed is an apparatus for the production of a blown tubular film (FT). The apparatus includes an independent device for the localized thickness adjustment at the strips adjacent to the folding edges resulting from the flattening of the tubular film (FT) by means of adjustment elements formed in angular sectors of limited extension symmetrically arranged 180° apart. The independent device for the localized thickness adjustment being a volumetric type device having a rotating ring that performs a rotating adjustment of the flow rate of a cooling air stream which takes into account the angular offset resulting from the operational parameters of the apparatus.

11 Claims, 16 Drawing Sheets

(51) Int. Cl.
  *B29C 48/00* (2019.01)
  *B29C 55/28* (2006.01)
(52) U.S. Cl.
  CPC ........ *B29C 55/28* (2013.01); *B29C 2948/926* (2019.02); *B29C 2948/92152* (2019.02); *B29C 2948/92447* (2019.02)
(58) Field of Classification Search
  CPC . B29C 48/912; B29C 48/9215; B29C 48/913; B29C 48/0017; B29C 48/0018
  See application file for complete search history.

(56) References Cited

U.S. PATENT DOCUMENTS

| | | | | |
|---|---|---|---|---|
| 4,246,212 A | * | 1/1981 | Upmeier | B29C 48/92 425/141 |
| 4,425,290 A | * | 1/1984 | Upmeier | B29C 48/92 425/141 |
| 4,443,400 A | * | 4/1984 | Herrington | B29C 48/913 425/72.1 |
| 4,624,823 A | * | 11/1986 | Audureau | B29C 48/913 425/72.1 |
| 5,178,806 A | | 1/1993 | Predoehl | |
| 5,281,375 A | * | 1/1994 | Konermann | B29C 48/92 425/141 |
| 5,288,219 A | * | 2/1994 | Smith | B29C 48/10 425/141 |
| 5,326,627 A | * | 7/1994 | Yazaki | B29C 48/10 428/116 |
| 5,562,926 A | * | 10/1996 | Karl | B29C 48/10 425/141 |
| 5,676,893 A | * | 10/1997 | Cree | B29C 48/92 264/40.6 |
| 5,804,221 A | * | 9/1998 | Planeta | B29C 48/10 425/72.1 |
| 6,254,368 B1 | * | 7/2001 | Shinmoto | B29C 48/10 425/72.1 |
| 8,956,136 B2 | * | 2/2015 | Zimmermann | B29C 48/903 425/72.1 |
| 9,017,053 B2 | * | 4/2015 | Rubbelke | B29C 48/10 425/72.1 |
| 9,248,601 B2 | * | 2/2016 | Kulgemeyer | B29C 48/912 |
| 2002/0018822 A1 | * | 2/2002 | Krycki | B29C 48/913 425/72.1 |
| 2002/0130431 A1 | * | 9/2002 | Randolph | B29C 48/9125 425/141 |
| 2004/0113331 A1 | * | 6/2004 | Miyata | B29C 48/10 264/573 |
| 2011/0006452 A1 | * | 1/2011 | Bayer | B29C 48/92 425/141 |
| 2017/0015043 A1 | * | 1/2017 | Shimizu | B29C 48/10 |
| 2018/0126616 A1 | * | 5/2018 | Ponsiani | B29C 48/913 |

FOREIGN PATENT DOCUMENTS

| | | |
|---|---|---|
| EP | 2277681 A1 | 1/2011 |
| WO | 2012080276 A2 | 6/2012 |
| WO | 2016189518 A2 | 12/2016 |

* cited by examiner

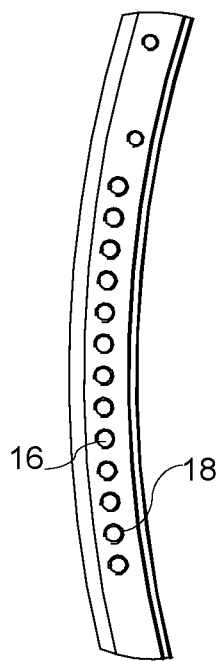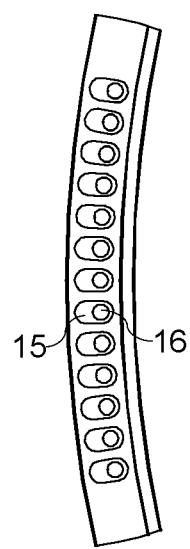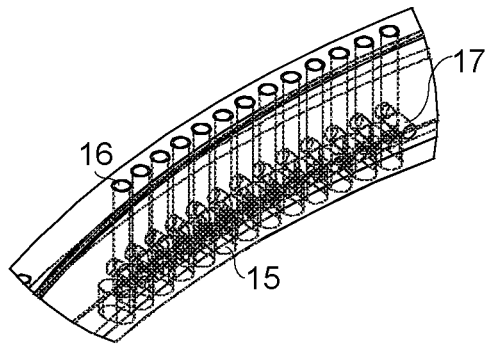
Fig.11a  Fig.11b  Fig.11c
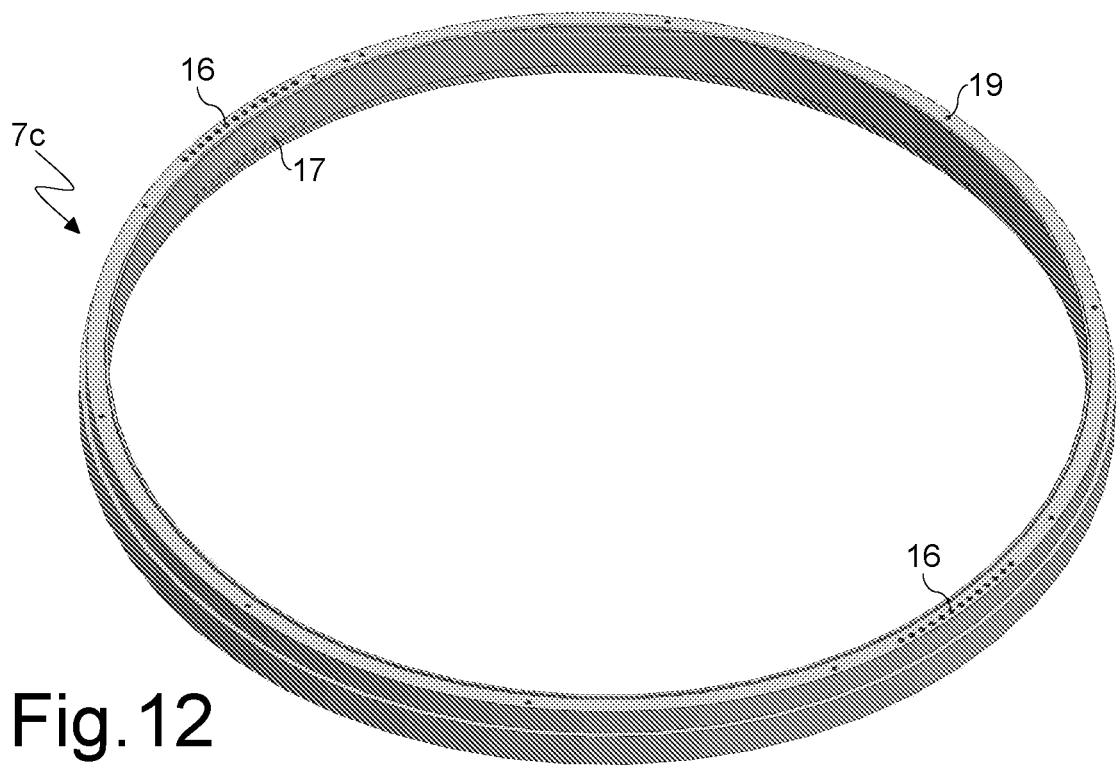
Fig.12

APPARATUS AND METHOD TO ADJUST THE THICKNESS PROFILE IN THE PRODUCTION OF BLOWN FILMS

CROSS-REFERENCE TO RELATED APPLICATIONS

This application is a 371 of PCT/IB2018/053649, filed May 23, 2018, which claims the benefit of Italian Patent Application No. 102017000055831, filed May 23, 2017.

FIELD OF THE INVENTION

The present invention concerns the plants for the production of blown films, i.e. plastic films extruded in the form of bubbles, and in particular an apparatus and a relevant method for adjusting the thickness profile of the film.

BACKGROUND OF THE INVENTION

The extrusion plants for blown bubble films produce a tubular film with a diameter and an average thickness defined starting from an extrusion head with a nominal diameter and extrusion gap calculated during the project, the desired actual values being obtained by adjusting, in manual or automatic mode, two parameters of plant operation.

A first parameter is the volume of gas (typically air) blown inside the bubble through suitable supply ducts passing through the body of the head and this volume of gas can be stationary, i.e. supplied only once at the beginning of the process and possibly corrected and topped up through suitable control means such as sensors, valves, etc. or it can be constant but subject to continuous replacement of the cooling gas (so-called Internal Bubble Cooling=IBC), so that the volume of gas is obtained from the balance between supply and extraction fans of the cooling flow. In the following specific reference will be made to air as a cooling gas but it is clear that any other suitable gas can be used.

The effect of the internal inflation of the bubble is a reduction in the thickness of the film compared to the initial thickness of the melt escaping from the extrusion head, due to the radial expansion produced, and the ratio between the diameter of the inflated bubble and the diameter of the extrusion head is called the inflation ratio (so-called Bubble Up Ratio=BUR).

The second parameter is the advancing or drawing speed of the bubble in relation to the speed of rotation of the extrusion head feeding screw(s), which defines the hourly flow rate of the molten material flowing into the extrusion head. A haul-off, fixed or rotating, usually consists of one or more pairs of motorized calender rollers and regulates, manually or more often automatically, the speed of advancement of the bubble determining a reduction in thickness in the longitudinal direction, i.e. the direction of advancement of the product that can be arranged along a vertical axis, from top to bottom or vice versa, or horizontally. This second reduction in thickness is generally greater than the transversal or radial thickness reduction due to the inflation of the bubble, and the ratio between the final speed of the tubular film and the dispensing speed of the melt from the extrusion head is defined as the draw ratio (Draw Ratio=DR).

When passing through the haul-off, the tubular film is flattened into a flat film having a width (so-called layflat) equal to the semi-circumference of the tubular film, so that it can be collected in reels and/or folded and/or cut lengthwise to produce a plurality of films collected in reels such as width submultiples, trimmings, etc. The thickness of a film thus produced, measured on a number of equally spaced points along its circumference or on the equivalent width in reels, shall have a mean thickness and a dispersion of values around the mean value, with a maximum value, a minimum value, a standard deviation and a variance. Here we disregard considerations related to the contraction due to the variation in density of the plastic material at varying temperatures, which is obviously considered by the automatic adjustment systems present on modern extrusion lines.

In order to obtain an increasingly higher film flatness, over the years many types of manual and automatic devices have been developed to reduce thickness dispersion. The prior art devices that allow this adjustment essentially operate in two ways, namely through heating elements that increase the temperature of the molten material near the lip of the die or the air flow, or through actuators that regulate the flow rate (see for example EP 1284180, DE 4218993). In the first type of device the heating elements can be arranged in the die of the extrusion head and/or in the cooling ring, while in the second type of device the actuators can be arranged in the cooling ring or in a special adjustment ring connected to the cooling ring or independent from it (typically placed between the extrusion head and the cooling ring).

In particular, automatic rings, such as the one described in WO 2012/080276, with a discrete number of actuators and/or heating elements arranged around the circumference of the bubble in formation so as to influence the extent of the reduction in thickness of the angular section of the film associated with them, are very widespread. Other times control systems, usually radiant furnaces with a discrete number of control sectors, can be installed around the bubble along its path.

In the case of automatic adjustment systems, the extent of the adjustment requires knowledge of the thickness profile of the bubble (so-called base profile) obtained by means of thickness sensors (capacitive, optical, nuclear, ultrasonic, etc.) installed on the line. The latter measure the thicknesses thanks to a relative rotary motion of the sensor around the bubble in the stretch of plant between the extrusion head and the calender haul-off, or at any other point where the film has tubular geometry in the form of a bubble, or make readings by performing transversal scans with respect to the direction of advancement of the product in the case of flattened tubular or sheet film obtained by opening the bubble.

A constant and accurate control of the base profile is essential because if the film collected in the reel layer after layer overlaps longitudinal strips with constantly stable and aligned thickness defects, the resulting reel will have evident compact and swollen areas where maximum thicknesses are superimposed and generally above the average, alternating with other soft and less cohesive areas with an external diameter below the average in correspondence with the strips of film characterized by minimum or lower thicknesses.

To minimize this phenomenon, known as creasing, the extrusion head or the line haul-off are rotated continuously or alternately, i.e. have a rotating or oscillating movement, and in the following the term "rotating" will be used for either type of rotation. In this way a relative rotation between the head and the haul-off is created so that the folding edges of the flattened film will rotate around the line axis while the effect on the reel will be a distribution of the thickness defects over the partial or whole width of the reel (see for example U.S. Pat. No. 3,474,160). The slow translation of each longitudinal section perpendicularly to the axis of the reel is effective and sometimes necessary even in the presence of automatic thickness adjustment systems, capable of minimizing but not eliminating the dispersion of thicknesses around the mean value.

Another type of procedure for obtaining a cylindrical coil is described in U.S. Pat. No. 5,178,806, in which systematic thickness errors of n layers wound in reel are compensated for by subsequent n layers with opposite thickness errors.

A particular technique of production of bubble films consists in the further reduction of the thickness after its flattening in the haul-off, obtained with a longitudinal stretching of the film by means of motorized rollers and/or additional calenders placed between the first haul-off roller and the winder placed at the end of the line. The operation of further longitudinal stretching can be performed on cold film or with partial softening of the film, and its extent may vary according to the purposes of this operation.

A small amount of longitudinal stretching applied to a film already subject to the action of automatic thickness adjustment devices can give the film a further reduction in the dispersion of the thickness profile, while significant amounts of additional stretching are imposed on the bubble film tubular in the in the case of production of pre-stretched film.

The tubular film, in this case, is guided through one or more stretching stations and subjected to large elongations up to the limit of 350% of the initial length, in order to reduce the final thickness of the product compared to the thickness of the extruded bubble and to reduce the residual elasticity of the film itself, so as to obtain mechanical properties of resistance to breakage, tear and rupture significantly different from those of the original film.

The additional longitudinal stretching process is accompanied by an inevitable transversal contraction of the tubular film (so-called neck-in), which is so much greater as the greater is the degree of longitudinal expansion and the distance between the rollers that impose such expansion. The tubular film will therefore have a large central area, between the two edge folds, characterized by a longitudinal expansion and a consequent reduction in thickness that are relatively uniform, while near the edge folds the reduction in thickness is less than in the central area and also is not uniform and regular for an extension in width depending on the extent of the expansion and the neck-in phenomenon.

Therefore, the lateral strips having a greater and irregular thickness are trimmed and removed and only the central area of the film is collected in reels, with more or less significant waste in percentage terms according to the width of the tubular film and to the entity of the neck-in phenomenon.

The final thickness profile will therefore be the superimposed effect of two separate dispersions, i.e. a first "base profile dispersion" generated by the extrusion, inflation, cooling, etc. system and a second "localized profile dispersion" generated by the local stretching deformation effects in the edge area.

The base profile dispersion is stationary in a reference system fixed in the extrusion head while the localized profile dispersion is rotating in the same reference system, and vice versa in a reference system fixed on the haul-off the base profile dispersion is rotating while the localized profile dispersion is stationary, therefore in both reference systems the two overlapping adjustments will be one stationary and the other rotating.

From a theoretical point of view, it is therefore possible to imagine four different systems for adjusting the thickness profile, arranged in the extrusion head reference system and/or in the haul-off reference system, depending on whether independent adjustment devices are used with a software that coordinates the two devices taking into account the necessary phase control due to the distance between head and haul-off, or whether they are "mixed" devices in terms of stationary/rotating operation in the case of a combination of several devices in the same reference system.

In the case of independent control devices, a first type of system includes a primary adjustment device located in the extrusion head reference system (e.g. automatic ring, automatic head, etc.) which corrects the dispersion defect of the base profile, while a second device dedicated to the correction limited to the two opposite sectors of the bubble coinciding with the folding edges shall be located on the haul-off upstream of the first drive roller (e.g. between the collapsing boards) or interposed between the first drive roller and the subsequent drive rollers.

The principle of adjustment of a device located on the haul-off may be of various nature (thermal, volumetric or mechanical), and the response speed of the system will not be particularly critical since the device is stationary in that reference system. Also the number of control points, i.e. the angular amplitude of the sector controlled by a discrete number of actuators, is independent of the primary adjustment system and can be sized and designed according to the type of error introduced by the localized profile dispersion.

A second type of system still includes two independent adjustment devices such as those referred to above, but in this case the second device shall be located in the same reference system as the extrusion head and shall have a rotation with respect to the extrusion head with all the appropriate phase controls. Also in this case, the number of control points, i.e. the angular amplitude of the sector controlled by a discrete number of actuators, is independent of the primary adjustment system and can be sized and designed according to the type of error introduced by the localized profile dispersion.

In the case of mixed adjustment devices, a third type of system (already known, for example, from EP 2277681) comprises a single stationary adjustment device located in the extrusion head which adjusts the thickness profile according to both the base profile dispersion and the localized profile dispersion, i.e. with a control software which adjusts the adjustment setting of the device by adding a 'stationary' and a 'rotating' profile superimposed on it. In this case, it will be necessary to adapt the number of control points to the smallest of the angular sectors to be controlled, and in particular if in the edge area there is required a control of angular sectors of the bubble smaller than in the central areas of the flattened tubular, each angular section of the device must be split in accordance with this small angle.

As a result, the number of device control points and the associated costs will increase since the edge control passes, rotating, through each angular section of the device. Conversely, keeping the number of control points unchanged to avoid the increased complexity and cost of the device would not provide sufficient angular resolution for effective intervention in the strips adjacent to the folding edges.

In addition, the response time of the control mechanisms must be suitable to allow the system to adapt the adjustment to the speed of rotation of the edges themselves. For example, a thermal control system with the associated inertial phenomena would impose very long system rotation times, and even if an increase in installed power could allow a reduction in response times it would at the same time make the convergence and stability of the control system more critical.

Finally, in a fourth type of system (also known from EP 2277681) the base profile dispersion adjuster and the localized profile dispersion adjuster are still combined in one device, but part of the device has an independent rotational movement and local adjustment capability to achieve a controlled rotary variation of the base profile adjustment.

SUMMARY OF THE INVENTION

The present invention belongs to the second type of adjustment system and aims to provide an apparatus and a method for the localized adjustment of the thickness of the tubular film that adjusts the thickness profile of the strips adjacent to the folding edges so as to compensate as much as possible the non-uniform variation in thickness produced by the longitudinal stretching carried out after the flattening of the tubular film.

This object is achieved through a volumetric apparatus characterized by the presence of an independent rotating ring for the rotary adjustment of the cooling air flow rate, as well as through its relevant method of operation. Further advantageous features of the apparatus in question are specified in the dependent claims.

The main advantage of this apparatus is that it achieves a high angular control resolution with a significant reduction in system cost and complexity, as well as system response time problems, compared to a prior art third or fourth type adjustment system as described above, where a stationary base adjustment and a rotary localized adjustment are superimposed. In this way, it is possible to feed the stretching calendar with a tubular film characterized by a thickness profile suitably altered near the folding edges with a shape complementary to the not evenly distributed effects generated by the stretching, thus obtaining in a simple and effective a significant reduction in the amount of lateral waste until the potential complete use of the layflat, with the total elimination of the phenomenon.

Another advantage of this device comes from the fact that it is made with conventional, simple and inexpensive components, which in some cases could also be installed on existing systems as an after-market upgrade.

BRIEF DESCRIPTION OF THE DRAWINGS

Further advantages and characteristics of the apparatus and method according to the present invention will be evident to those skilled in the art from the following detailed and not limiting description of three embodiments thereof with reference to the attached drawings in which:

FIGS. 11a-11c are enlarged views of detail XI of FIG. 9 respectively from above, below and in perspective view in transparency;

FIG. 12 is a perspective view of the ring in FIG. 9;

DETAILED DESCRIPTION OF THE INVENTION

Figure 1:
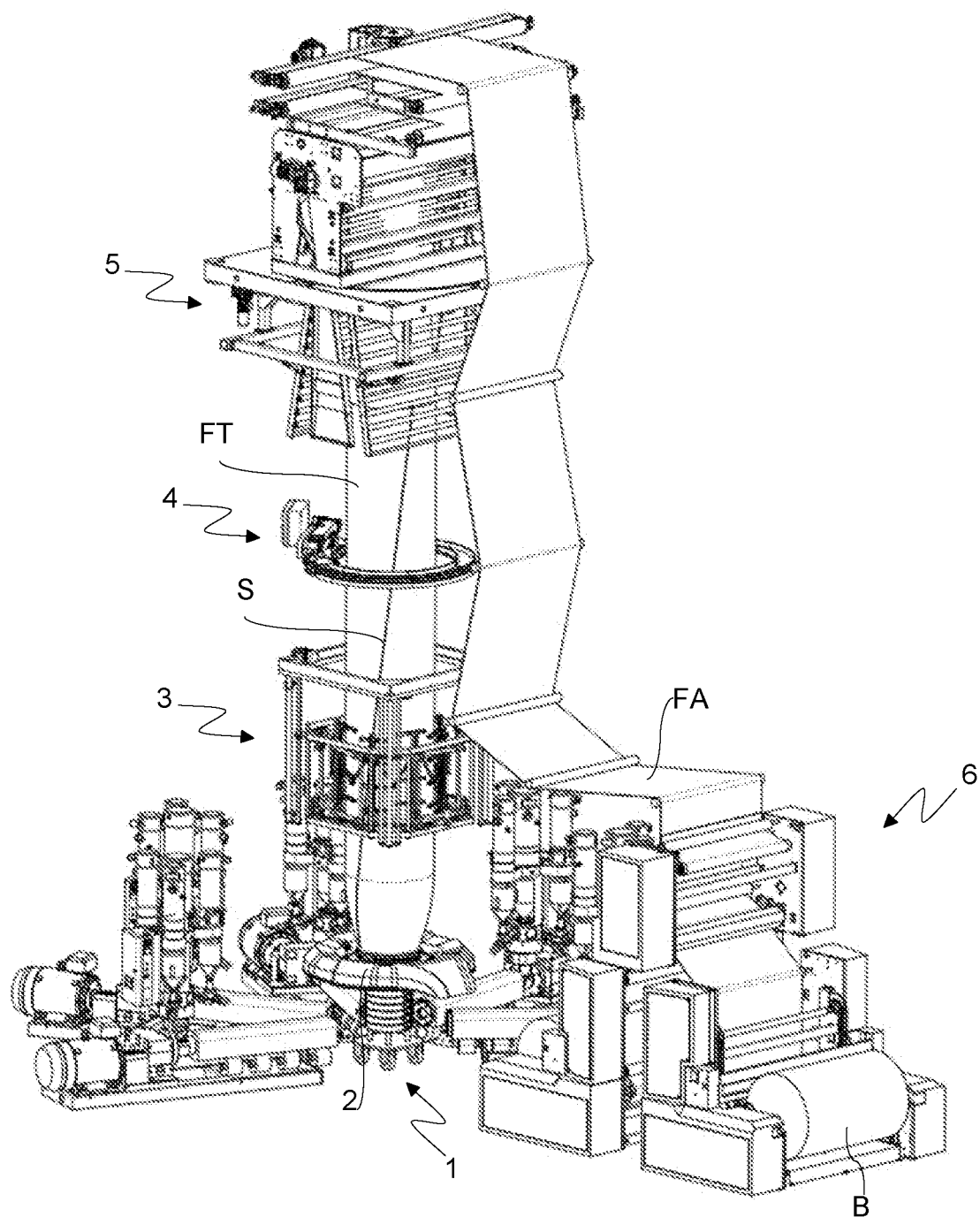
FIG. 1 is a perspective view of a plant for the production of blown films including the above device placed in a cooling ring.
Figure 2:
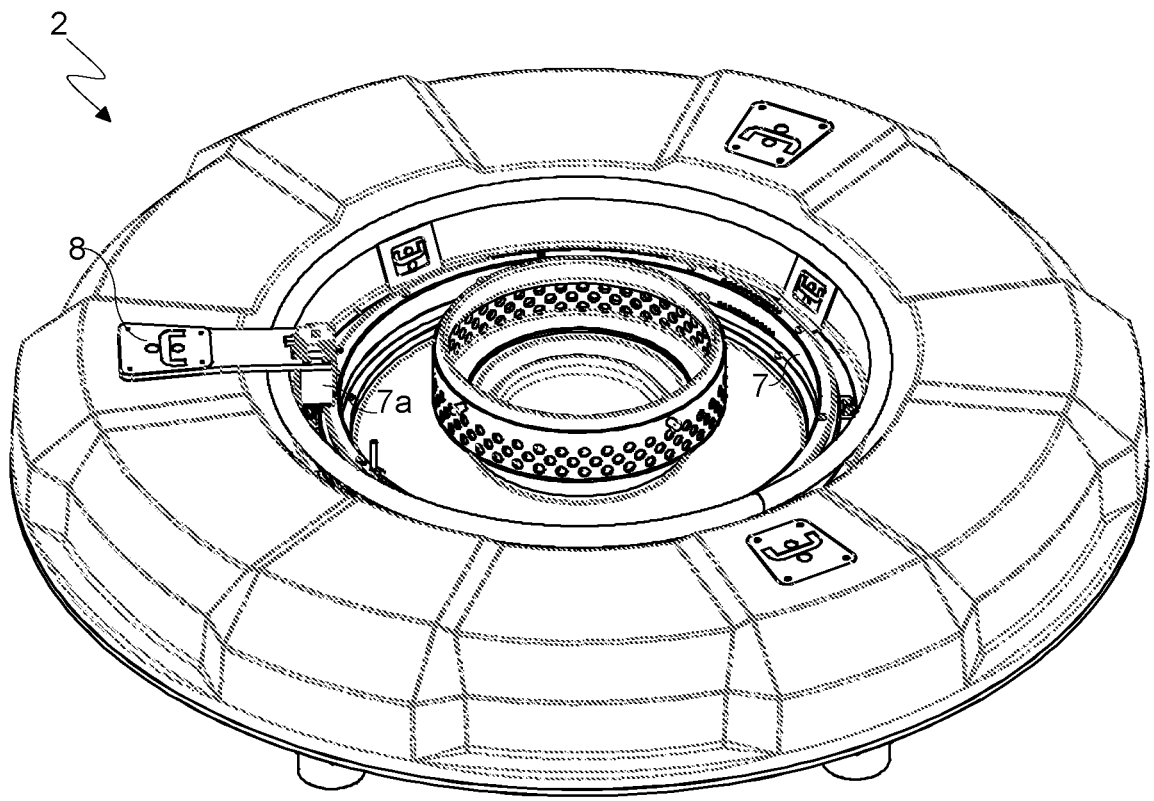
FIG. 2 is a perspective view of the cooling ring of the plant of FIG. 1, with a first embodiment of the device located therein.
Figure 3:
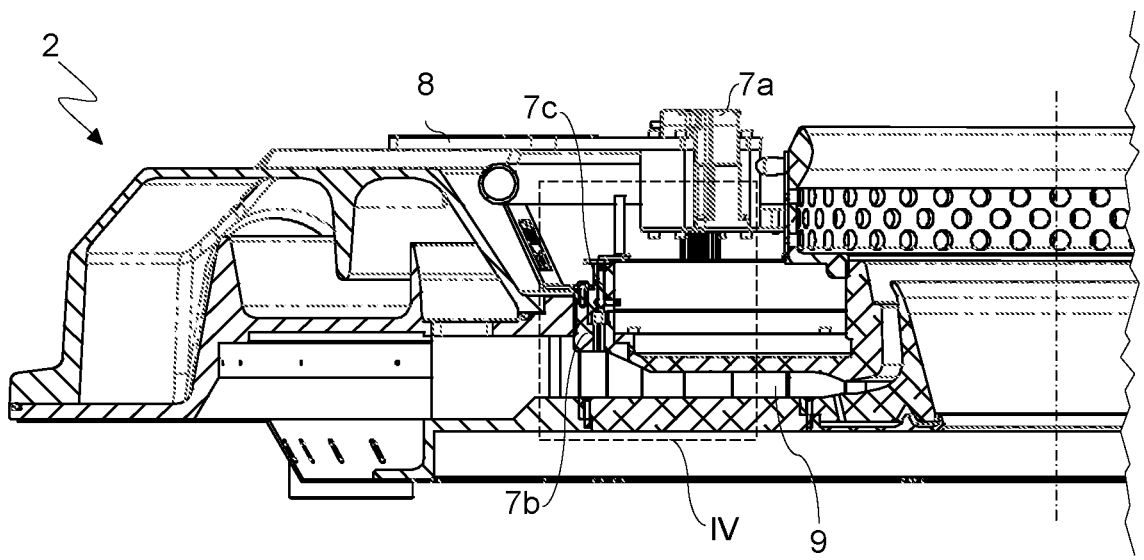
FIG. 3 is a sectional semi-view of the cooling ring of FIG. 2.
Figure 4:
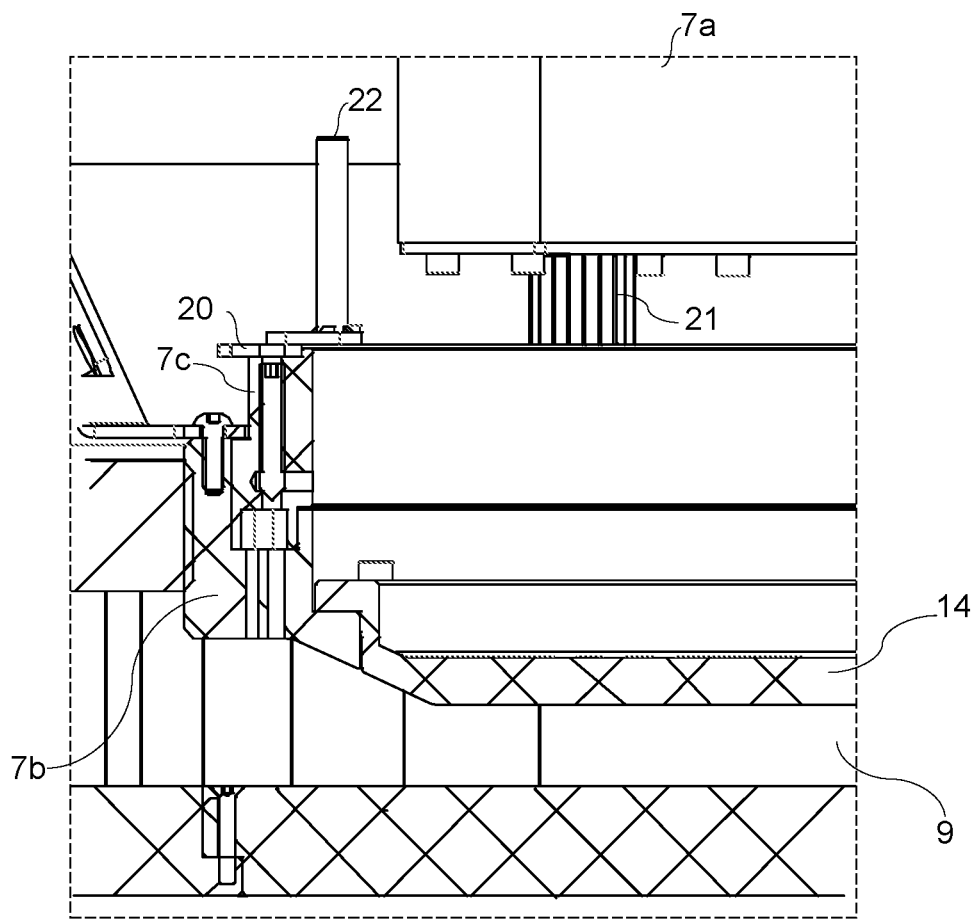
FIG. 4 is an enlarged view of detail IV of FIG. 3.
Figure 5:
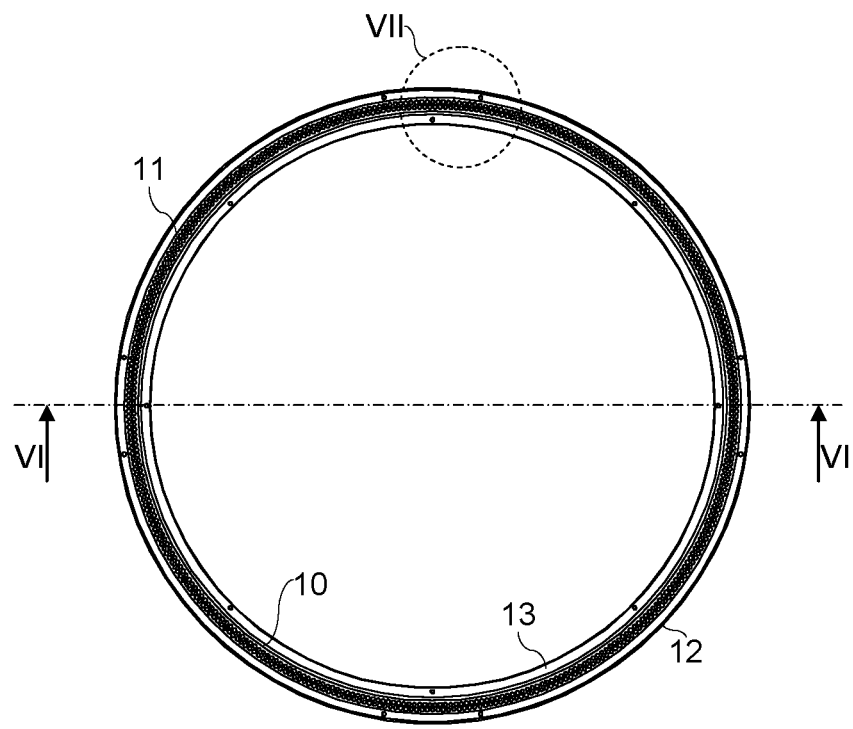
FIG. 5 is a top plan view of a static ring of the device.
Figure 6:
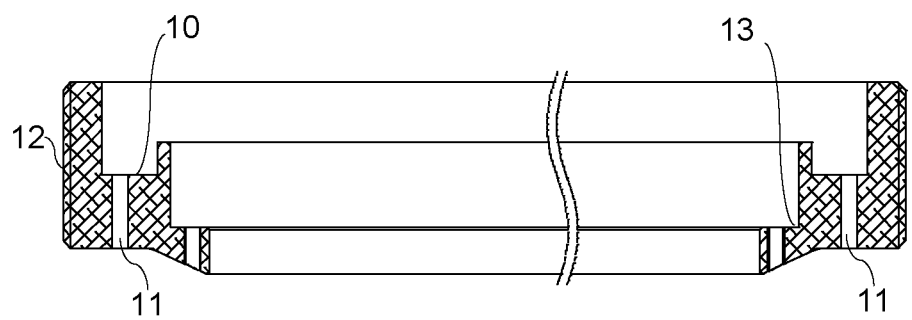
FIG. 6 is a sectional view according to line VI-VI of FIG. 5.
Figure 7:
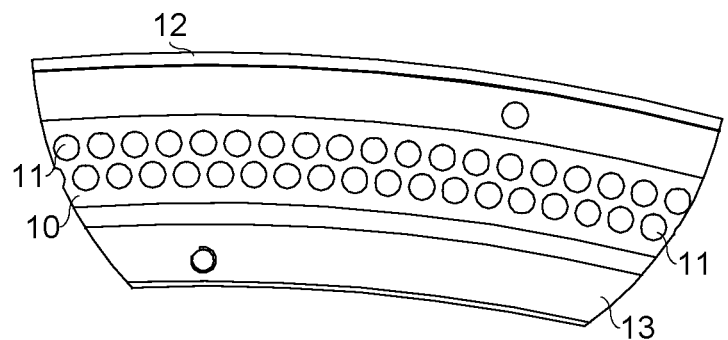
FIG. 7 is an enlarged view of detail VII of FIG. 5.
Figure 8:
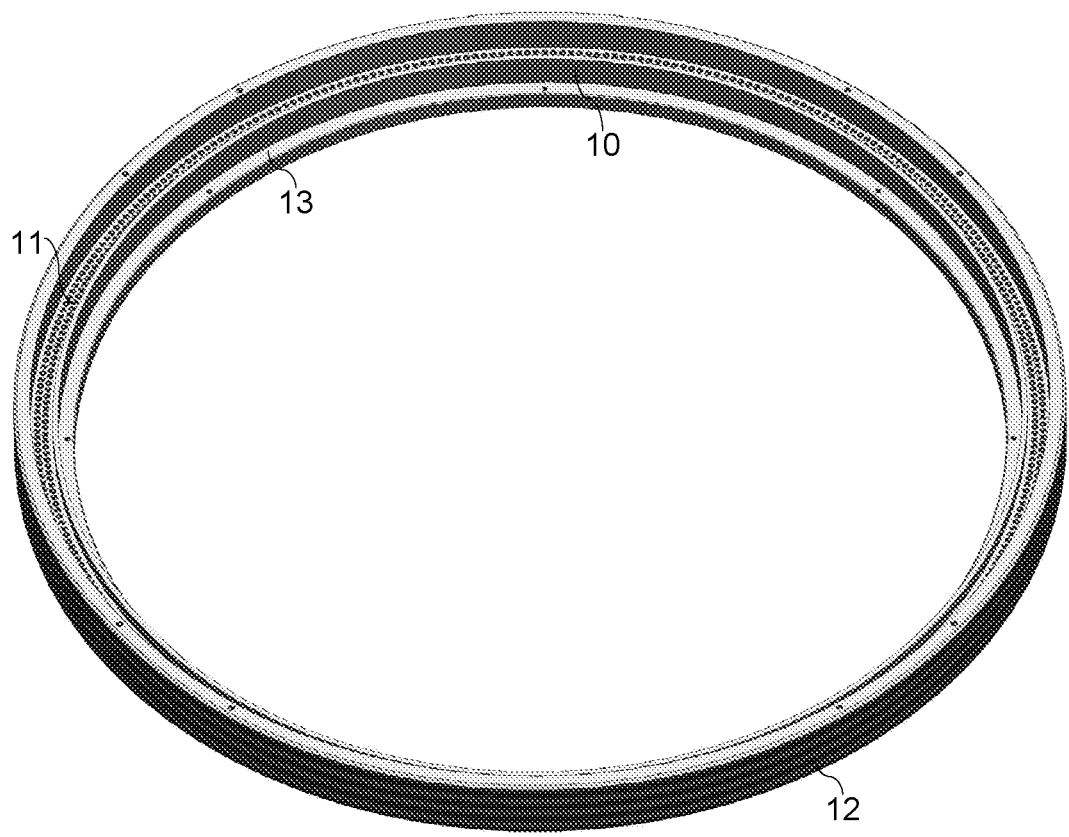
FIG. 8 is a perspective view of the ring of FIG. 5.
Figure 9:
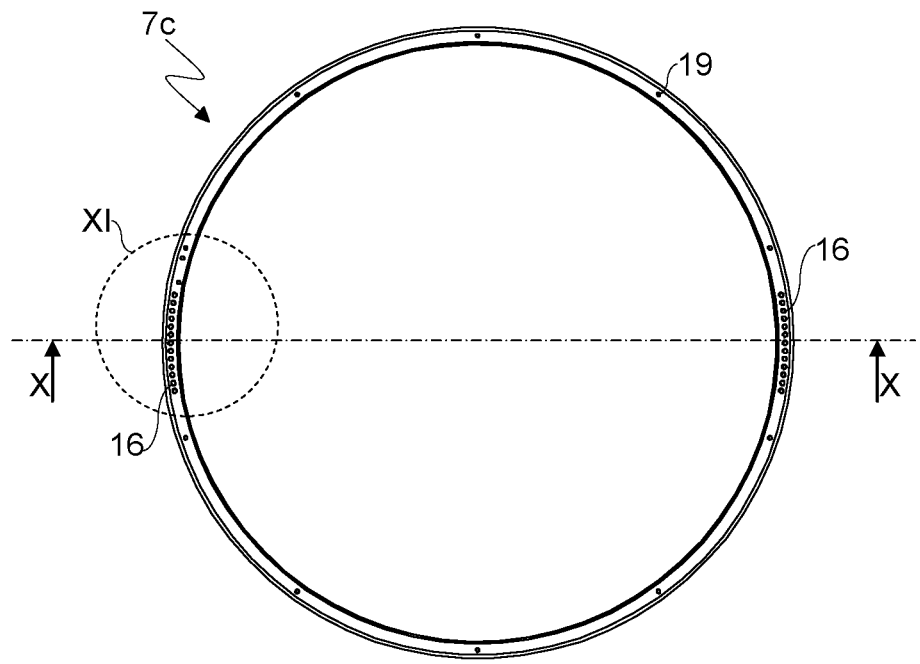
FIG. 9 is a top plan view from above of the rotating ring of the device.
Figure 10:
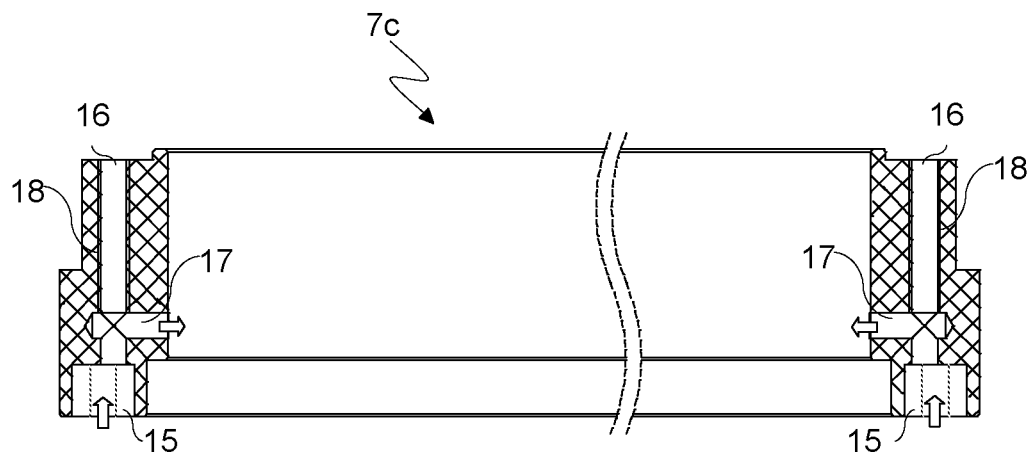
FIG. 10 is a sectional view according to line X-X of FIG. 9.

Referring to FIGS. 1 to 4, there is first illustrated the location of the apparatus according to the present invention in a conventional plant for the production of blown films, including an extrusion head 1, a cooling ring 2, a calibration cage 3 to guide the tubular film FT, a thickness measuring device 4, a haul-off device 5 and a winding unit 6 where the flattened film FA is trimmed and possibly divided into several parts before being wound in reels B.

The localized adjustment device 7 is located inside cooling ring 2 downstream of the primary adjustment device, and a mechanism 7a that drives the rotating ring of device 7 is fixed at the top of cooling ring 2 by means of bracket 8. Device 7 comprises a static ring 7b fixed to cooling ring 2 and shaped for a sliding fit with a rotating ring 7c superimposed on it.

The cooling ring 2 is fed through a plurality of ducts that feed air into a labyrinth, at the end of which a circle of holes lets air pass to a control chamber where the primary adjustment device (not shown) regulates the flow rate and/or temperature of the air flow before directing it towards a channel 9 that carries the air up to the bubble in formation.

Device 7 communicates with said channel 9 through ducts and cavities in the base static ring 7b and in the rotating control ring 7c, as described in detail below, in order to draw and disperse a controlled fraction of the cooling air. The dispersion of this fraction of air takes place outside the bubble and far enough away from it to be irrelevant, whereby the localized adjustment effect is given by the reduction of the air flow downstream of the primary adjustment device. This reduction implies less cooling in the angular sectors where folding will be carried out when the tubular film FT is flattened in the calender of haul-off 5. In this way, a greater reduction in thickness is obtained in the strips adjacent to the folding edges with the function of preventive action, taking into account the fact that the mechanical action of longitudinal stretching is less effective on these strips.

Figure 13:
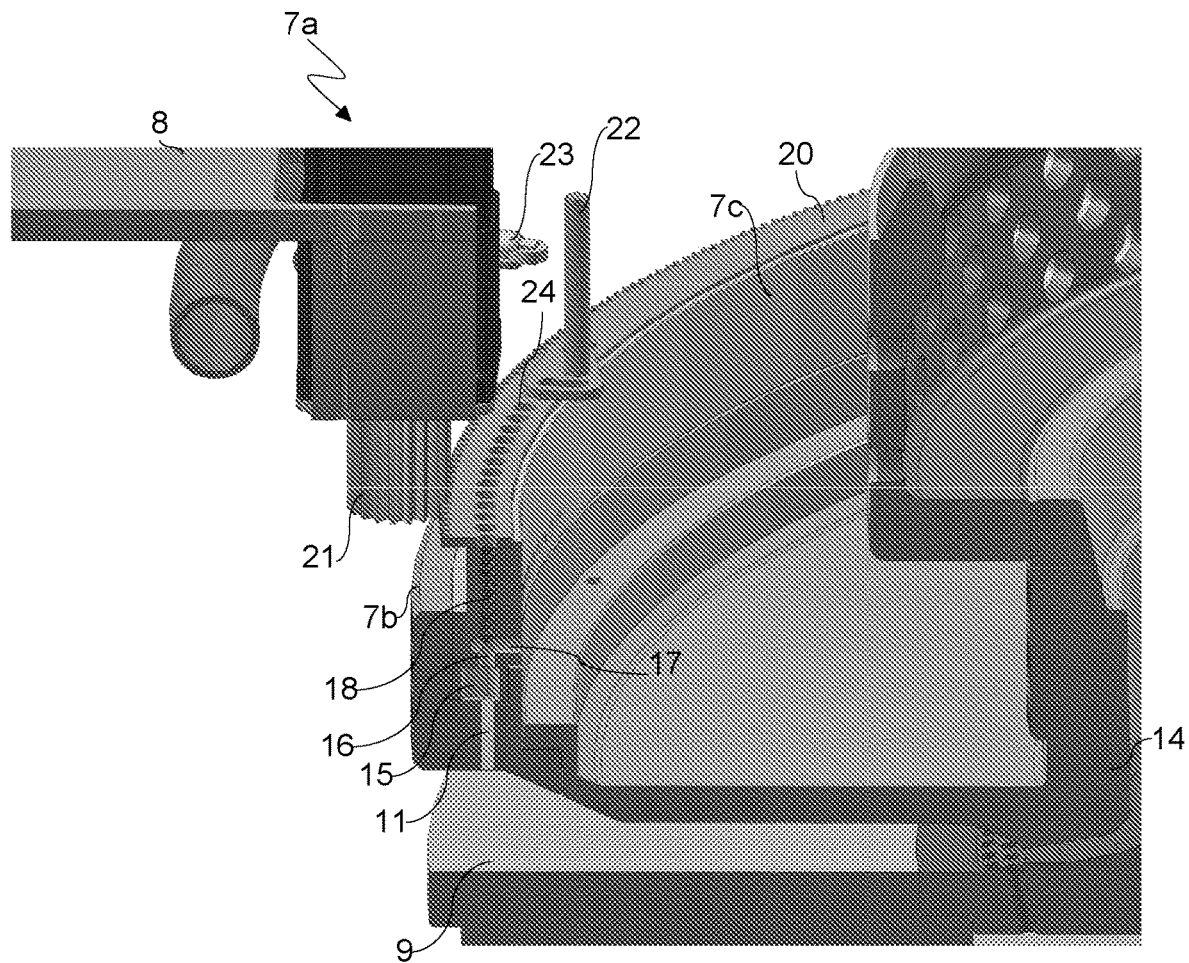
FIG. 13 is a perspective view of an enlarged partial section of the cooling ring showing the detail of the drive of the rotating ring of the device.

The static ring 7b, as shown in FIGS. 5 to 8, has a top channel 10 with a U-shaped section that has one or more concentric circles of axial through holes 11 in the bottom. By way of example, in the specific embodiment shown in the figures there are two circles of holes 11 with a diameter of 5 mm and an angular pitch of 1°, i.e. 360 holes in each circle, with the two circles staggered by an angle of 0.5° and spaced radially by 6 mm. In addition, the static ring 7b is also provided with a thread 12 on the outer face for adjustable mounting on the cooling ring 2, and in the central part it serves as a seat 13 for mounting the internal insert 14, which defines the initial diameter of the bubble (see FIGS. 4 and 13).

The rotating ring 7c, as shown in FIGS. 9 to 12, has a bottom shape complementary to the aforementioned channel 10 so as to achieve a sliding coupling with the static ring 7b, with a minimum clearance of 0.1-0.3 mm. In this way, the bottom face of the rotating ring 7c closes the holes 11 except in correspondence of two small amplitude angular sectors symmetrically arranged at a distance of 180°, in which sectors passages are made to put channel 9 in communication with the outside as previously mentioned.

More specifically, the bottom face of the rotating ring 7c shall be provided at each of said angular sectors with a plurality of cavities having a radial extent sufficient to cover all the circles of holes 11 and an angular extent sufficient to cover at least one hole 11. An axial hole 16 extends between cavity 15 and the top face of the rotating ring 7c and a radial hole 17 extends between said axial hole 16 and the inner face of the rotating ring 7c, the portion of the axial hole 16 above said radial hole 17 being provided with a thread 18.

In this way, the release through the radial hole 17 of cooling air coming from channel 9 through the axial holes 11, cavity 15 and the axial hole 16 can be adjusted for each radial hole 17 by means of an adjustment screw (not shown) screwed into thread 18. Device 7 thus performs a localized thickness adjustment in the two opposing angular sectors where the folding edges will be located when the tubular film FT is flattened in haul-off 5. The amount and the angular resolution of this localized adjustment depend on the number, arrangement and dimensions of the air passages 11, 15, 16, 17 as well as obviously on the final adjustment by means of the above-mentioned screw.

By way of example, in the specific first embodiment illustrated in the above figures, each localized adjustment sector includes thirteen cavities 15 measuring 7×12 mm, while the holes 16, 17 have a diameter of 5 mm and the thread 18 is an M6 thread, said holes 16, 17 having an angular pitch of 1.5°, so that the adjustment sector has a total angular extension of 19.5°. Considering that the primary adjustment device comprises 48 channels 9, whereby a single primary control sector has an angular extension of 7.5°, the localized adjustment has five partial controls for each primary controller, so that the sectors dedicated to the localized adjustment are equivalent to having an adjustment device with 240 controllers instead of 48. In other words, to achieve the same angular control resolution in a known third type control system as described above, where a stationary base adjustment and a rotary localized adjustment are superimposed, it would be necessary to increase the number of primary controllers by five times with a corresponding increase in system cost and complexity, as well as in system response time problems.

As mentioned above, the rotating ring 7c rotates with respect to the static ring 7b, sliding into channel 10 under the action of a drive 7a fixed to the cooling ring 2. To this end, in this embodiment illustrated in particular in FIGS. 2-4 and 13, the rotating ring 7c is equipped with threaded holes 19 at the top for fastening a crown gear 20, which is engaged by a pinion 21 driven by an electric motor, preferably a stepping motor.

A reference peg 22 is also attached to the rotating ring 7c to operate a microswitch 23, integral with the drive mechanism 7a, which, in combination with the stepping motor position control and the rotation signals of haul-off 5, allows the phase alignment between the rotating ring 7c and the position of the folding edges of the tubular film FT to be maintained. This check of the reference or zero point along the rotating ring 7c is necessary both during start-up and when changing the axial position of the static ring 7b by turning thread 12, to take into account the dragging effect on the rotating ring 7c which, despite the engagement between the crown gear 20 and the pinion 21, is not completely locked in rotation.

The crown gear 20 is also obviously provided with holes 24 corresponding to the holes 16 to allow the screws for adjusting the holes 17 to be screwed into them.

It is also obvious that various aspects of the first embodiment of the apparatus described above can be modified and/or replaced with equivalents according to the normal knowledge of a person skilled in the art. A non-exhaustive list of these aspects includes:

a) the functions of holes 16, 17 could be reversed by achieving the release of air through the axial holes 16 and the adjustment through the radial holes 17 which would be equipped with the thread 18, even if in this case it would be more inconvenient to adjust manually by screwing/unscrewing the adjustment screws in thread 18 especially if the internal insert 14 (which is interchangeable) has such dimensions as to be close to the inner face of the rotating ring 7c;

b) instead of manually adjusting the air release holes 16 or 17 by screwing/unscrewing the adjustment screws in the thread 18, this could be done automatically by means of suitable actuators and control systems;

c) drive 7a could rotate the rotating ring 7c by other means equivalent to the pinion 21-crown gear 20 gearing, for example with a belt-pulley system, a worm gear system, a magnetic system, etc.;

d) the check of the reference point could be achieved by other means equivalent to the peg 22-microswitch 23 system, such as an encoder system, a magnetic system with a Hall effect sensor, etc.

Another more general aspect that could be modified concerns the type of air flow on which the localized adjustment device acts, which in the embodiment illustrated above is the air flow resulting from the primary adjustment for the correction of the base profile. Such an air flow therefore has different flow rate and/or temperature characteristics in each primary control sector through which the adjustment sectors of the rotating ring 7c pass, i.e. every 7.5° of rotation according to the previous example, so that the extent of the localized adjustment established by fixing the degree of opening of the release holes 17 is influenced by the primary adjustment.

To avoid this problem and to make the local adjustment independent of the primary adjustment, this device could be operated on a further cooling air flow that is uniform over 360°, which achieves a fixed and homogeneous correction to be duly taken into account in the primary adjustment, so that at any angular position the adjustment sectors of the rotating ring 7c produce a localized adjustment effect which only depends on the degree of opening of the release holes 17. In other words, holes 11 would not be in communication with channel 9 where the air coming from the primary adjustment device passes, but rather with a different channel where the above-mentioned uniform air flow, also directed towards the bubble, passes, even if this implies a relatively more complex and cumbersome system.

Another general aspect that could be modified concerns the type of intervention on the air flow carried out by the localized adjustment device, which in the above-mentioned embodiments consists in a removal and dispersion of a fraction of the flow. In one variant of the system an "opposite" adjustment to the one described above could be obtained in the sense that the device, instead of using the adjustment sectors to subtract from the cooling flow controlled quantities of air to be dispersed in the environment, uses them to prevent the passage of controlled quantities of air, obtaining however the same localized effect of less cooling.

The second embodiment of the device shown in FIGS. 14-29 shows how this can be achieved by means of segments that are attached to the rotating ring and that can be deformed in an adjustable manner to reduce the cross-sectional area of the cooling air duct in correspondence with the adjustment sectors. For ease of reference, the same numbers have been used for identical elements and the same numbers with the prime for corresponding elements.

Figure 14:
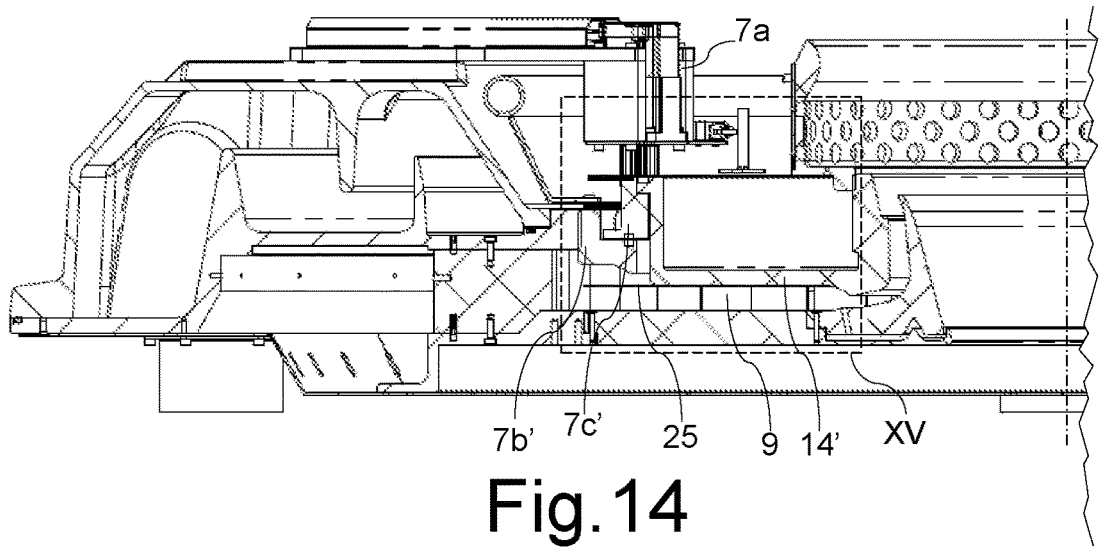
FIG. 14 is a view similar to FIG. 3 of the cooling ring with a second embodiment of the device located therein.
Figure 15:
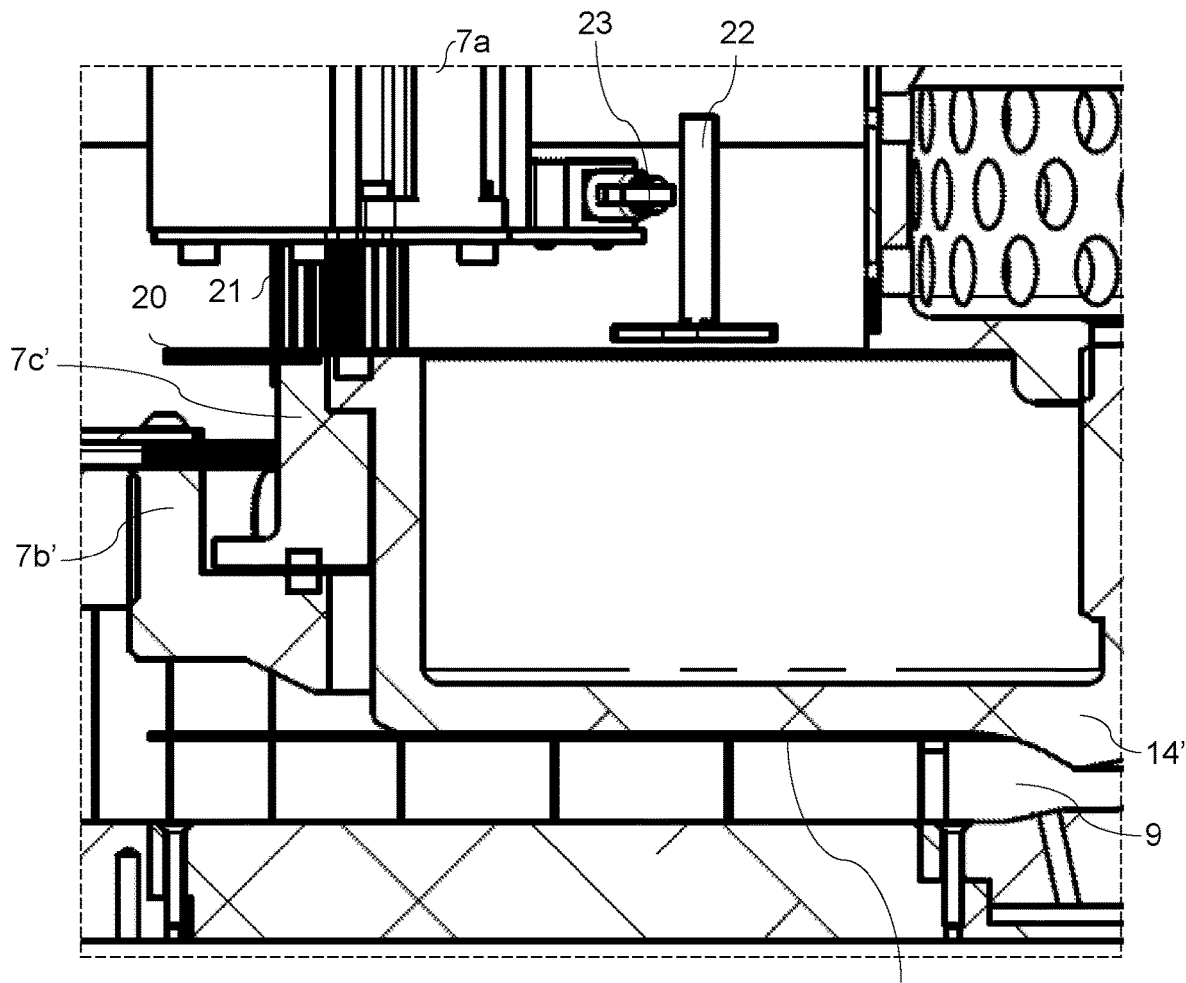
FIG. 15 is an enlarged view of detail XV of FIG. 14.

In the sectional view of FIG. 14 and in the relative enlarged detail of FIG. 15 we can see that this second embodiment includes, similarly to the first embodiment, a static ring 7b' fixed to the cooling ring 2 and shaped for a sliding coupling with a rotating ring 7c' overlapping it, which is moved by the same drive 7a fixed on the cooling ring 2. In other words, the rotating ring 7c' is also equipped with threaded holes 19 at the top for fastening a crown gear 20 which is engaged by a pinion 21 driven by a stepping motor, as well as for fastening the reference peg 22 to operate the microswitch 23.

However, since in this embodiment the adjustment takes place directly in channel 9 and not inside the rotating ring as in the previous embodiment, the internal insert 14' is not mounted on the static ring 7b' but on the rotating ring 7c' and is part of the localized adjustment since it carries a circle of deformable segments 25 arranged in said channel 9 below, as will be described in greater detail below.

Figure 16:
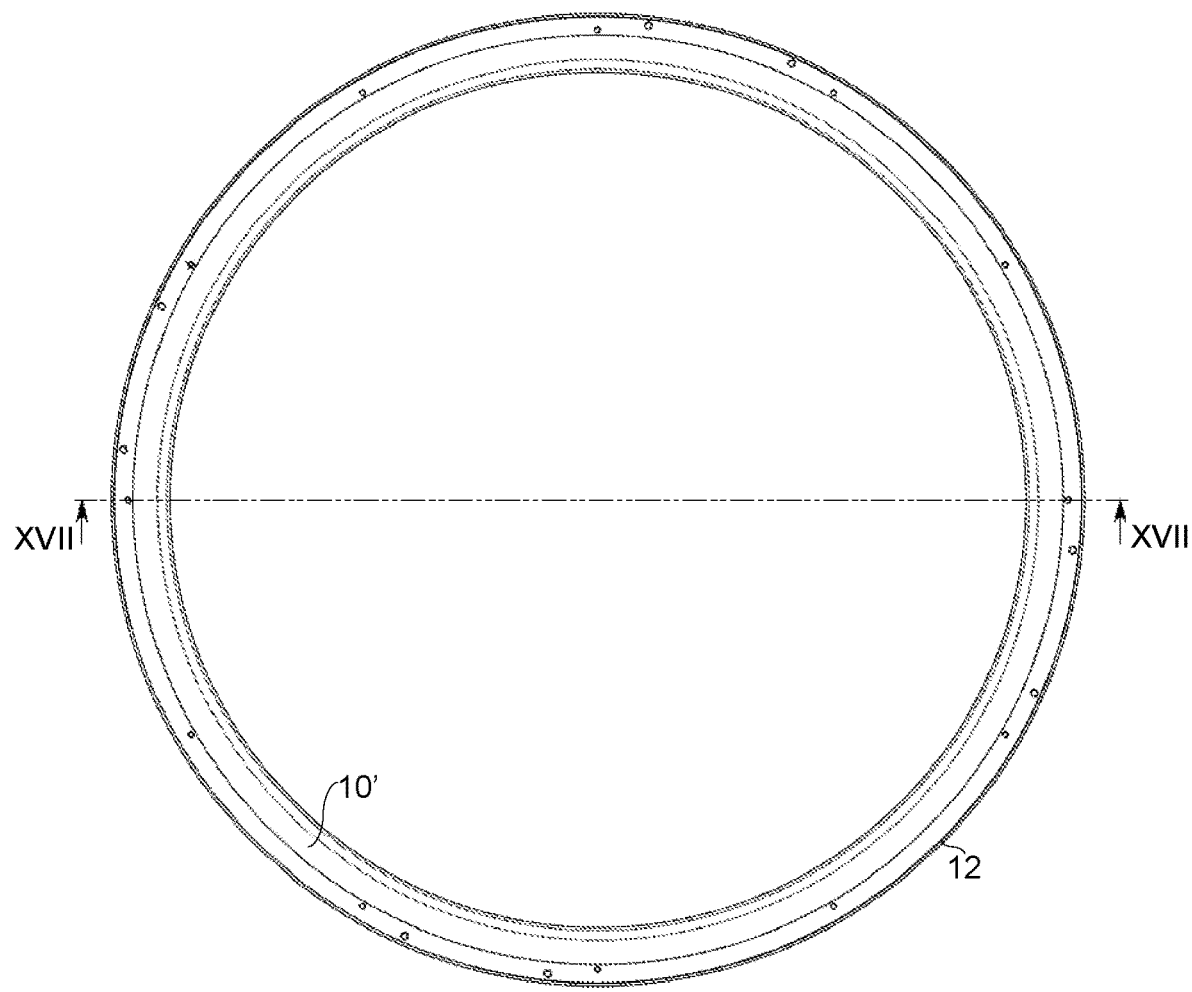
FIG. 16 is a top plan view of the static ring of the device of FIG. 14.
Figure 17:
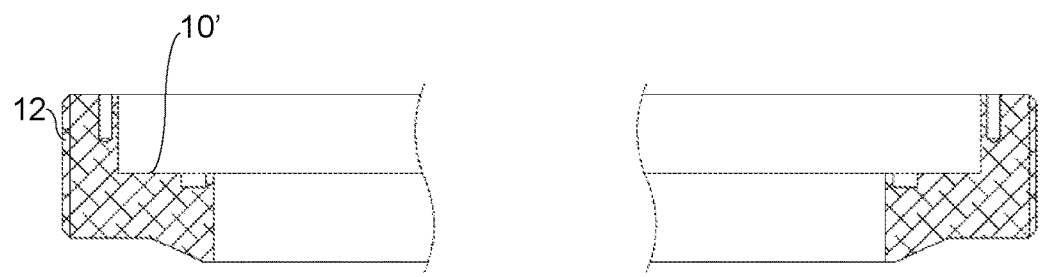
FIG. 17 is a sectional view according to line XVII-XVII of FIG. 16.
Figure 18:
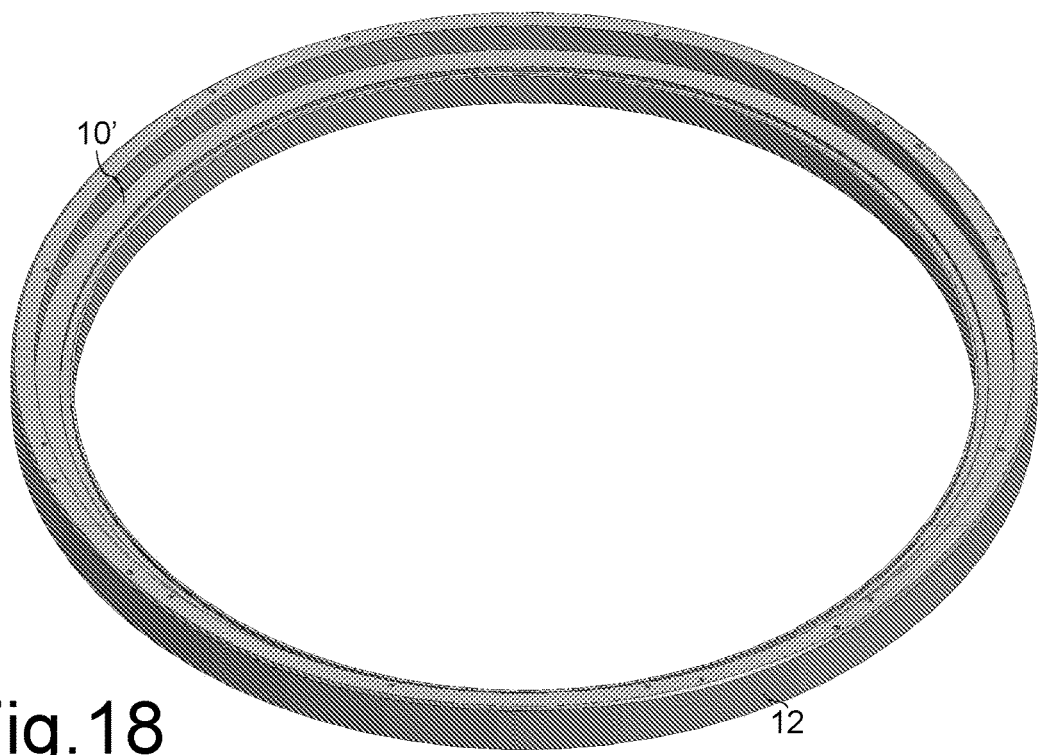
FIG. 18 is a perspective view of the ring of FIG. 16.
Figure 23:
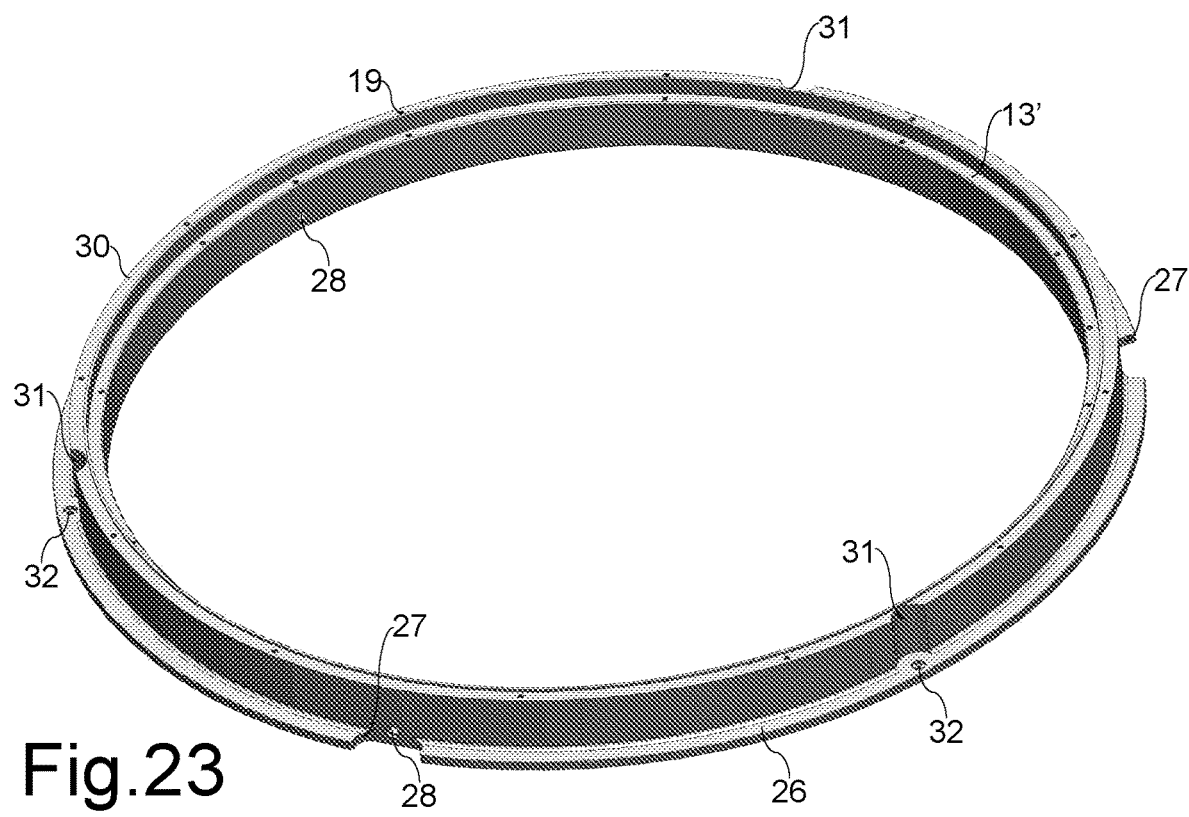
FIG. 23 is a perspective view of the ring of FIG. 19.
Figure 19:
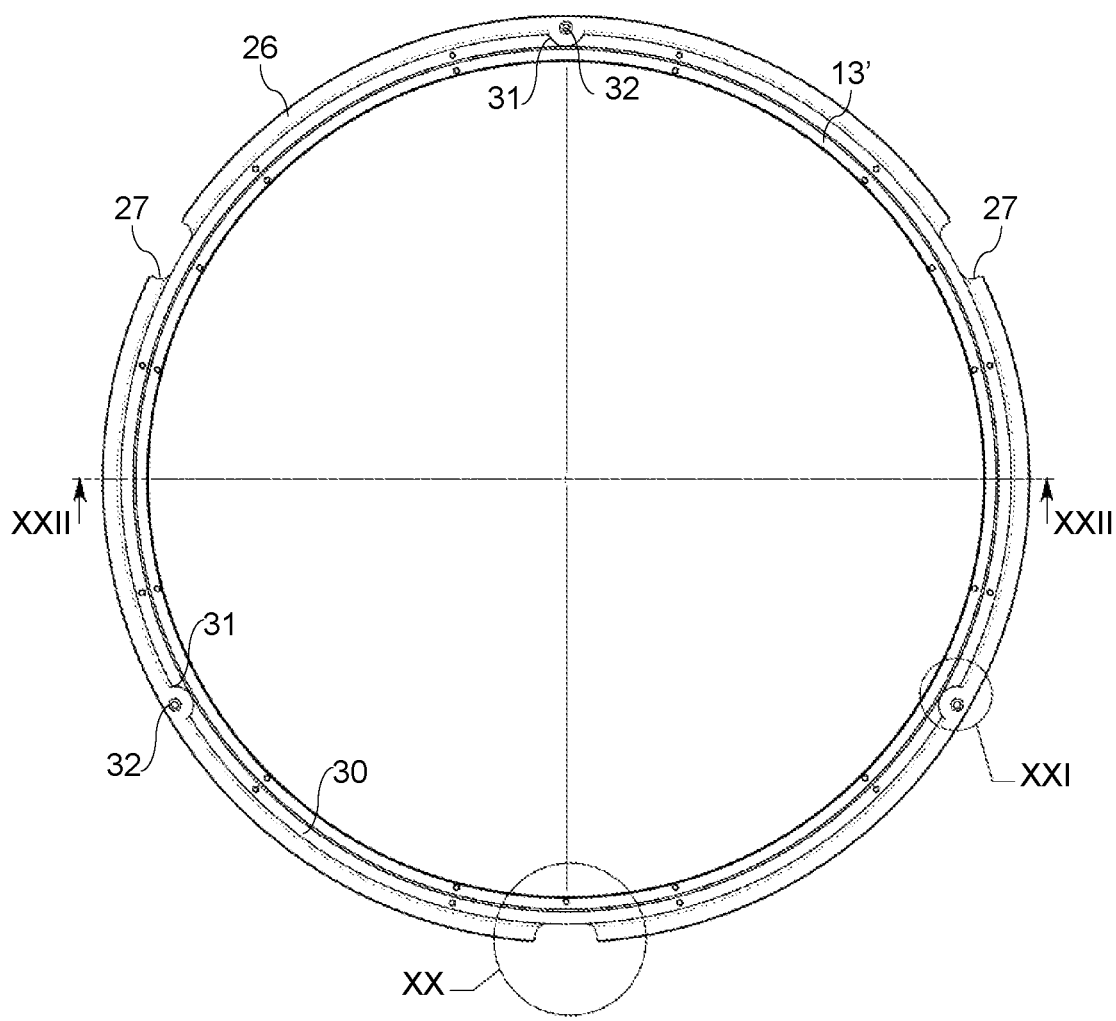
FIG. 19 is a top plan view of the rotating ring of the device of FIG. 14.
Figures 20A, 20B:
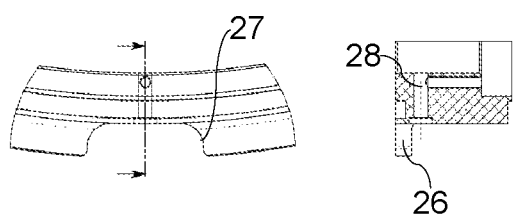
FIGS. 20a, 20b are an enlarged view of detail XX of FIG. 19 with a relevant vertical section.
Figures 21A, 21B:
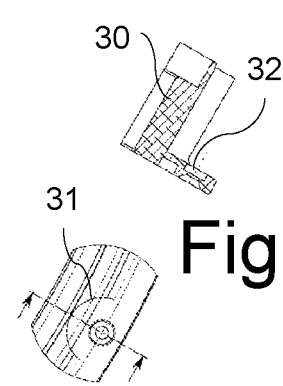
FIGS. 21a, 21b are an enlarged view of detail XXI of FIG. 19 with a relevant vertical section.
Figure 22:
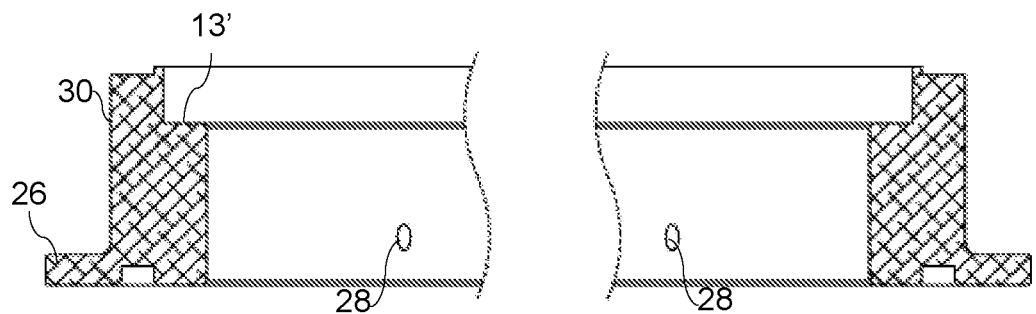
FIG. 22 is a sectional view according to line XXII-XXII of FIG. 19.

The static ring 7b', as shown in FIGS. 16 to 18, has a simple, substantially L-shaped, inward-facing section with a support surface 10' for the rotating ring 7c' and the external thread 12 for an adjustable mounting on the cooling ring 2.

The rotating ring 7c', as shown in FIGS. 19 to 23, also has an essentially L-shaped section but facing outwards and sized for a large overlap (e.g. 25 mm) with the support plane 10' of the static ring 7b'. However, since in this case, as mentioned above, the rotating ring 7c' also carries the internal insert 14' and the stabilizer mounted thereon, the sliding coupling with the static ring 7b' is replaced by a rotating coupling achieved by means of support and centering wheels (three each in the illustrated embodiment) to take into account the higher weight.

Figure 27:
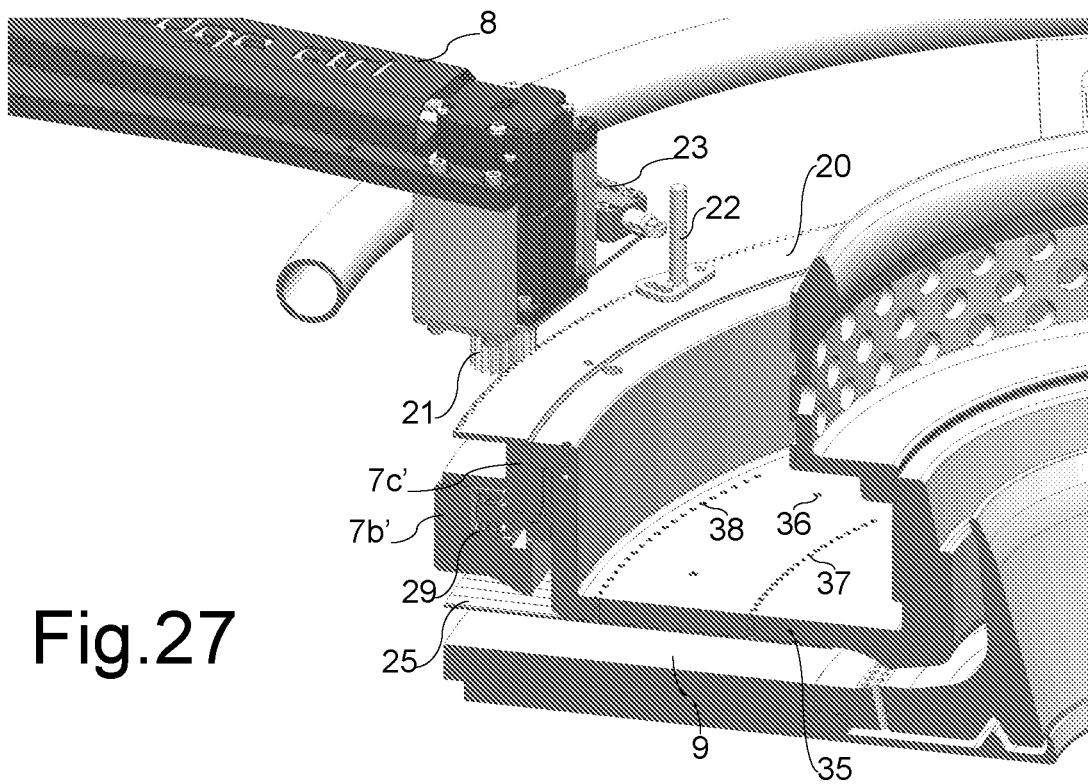
FIG. 27 is a perspective view of an enlarged partial section of the cooling ring showing the detail of the drive of the rotating ring of the device of FIG. 14 and the arrangement of one of the support wheels.
Figure 28:
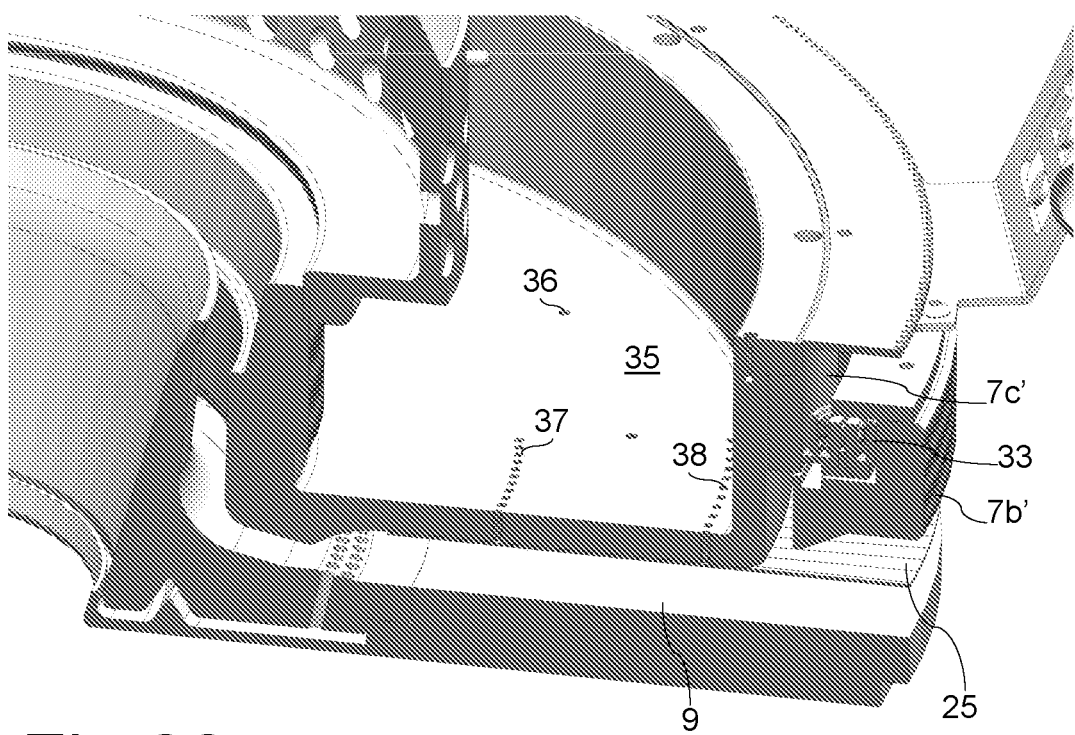
FIG. 28 is a view similar to the previous one but in the opposite position, which shows the arrangement of one of the centering wheels.

For this purpose, the outer lip 26 of the rotating ring 7c' has three recesses 27 arranged at a distance of 120° in correspondence with which radial holes 28 (FIGS. 20a, 20b) are made for the mounting of support wheels 29 (FIG. 27). Similarly, the outer wall 30 has three recesses 31 arranged at a distance of 120°, in positions opposite to said recesses 27, in correspondence with which in the outer lip 26 axial holes 32 (FIGS. 21a, 21b) are made for the mounting of centering wheels 33 (FIG. 28).

Figure 26:
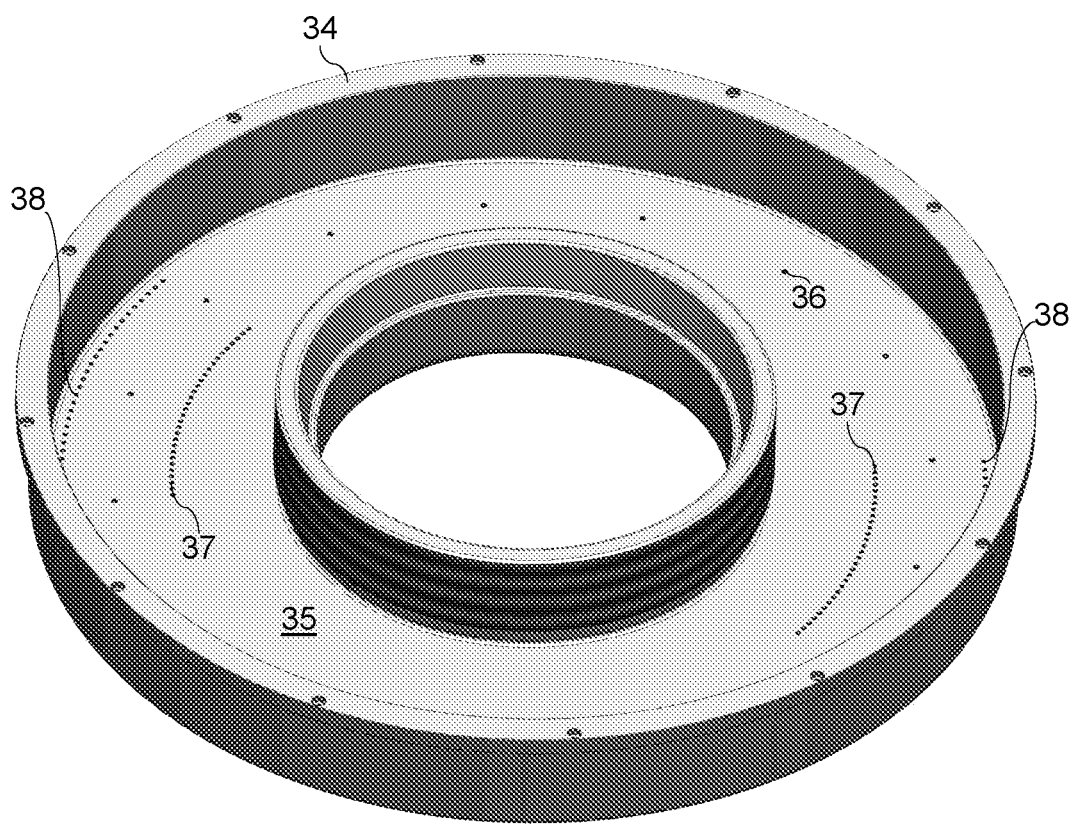
FIG. 26 is a perspective view of the insert of FIG. 24.
Figure 24:
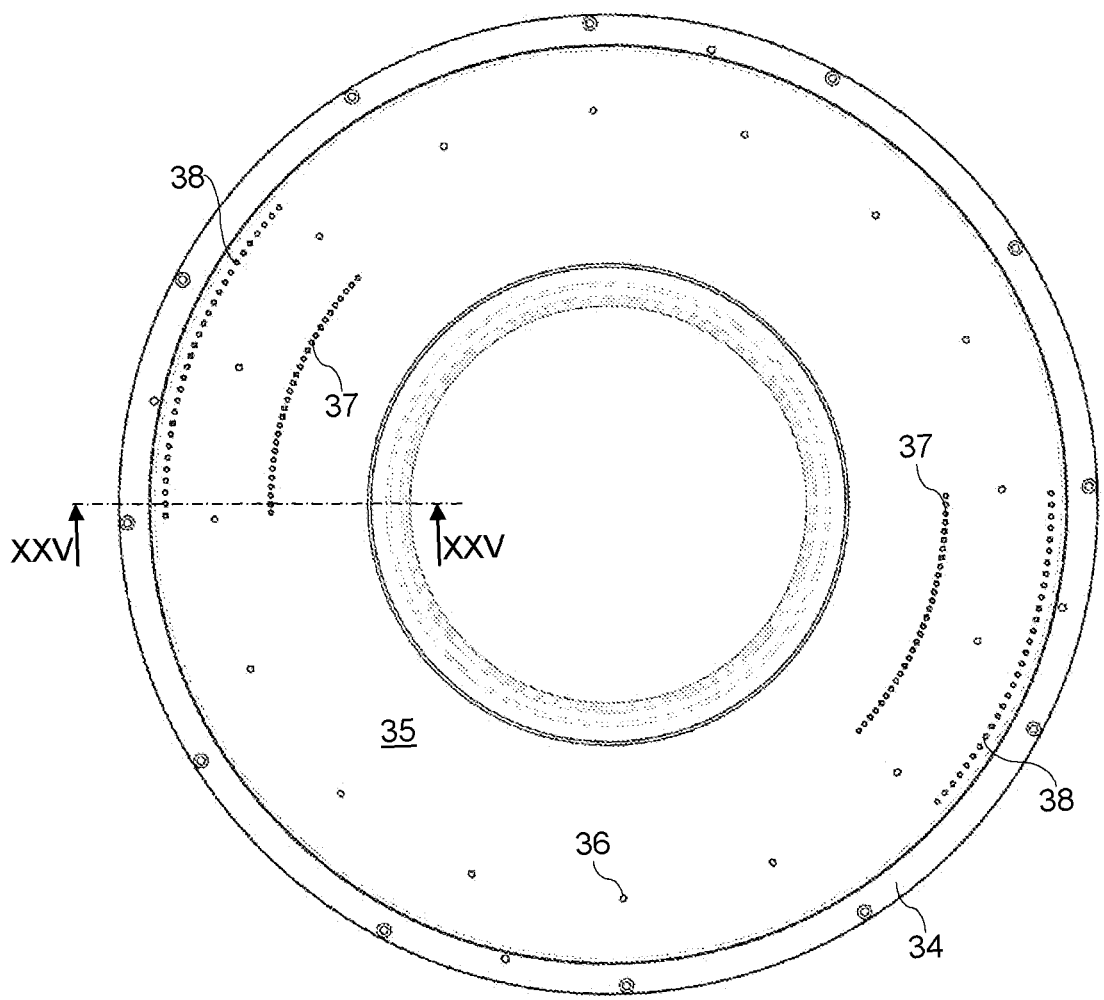
FIG. 24 is a top plan view of an interchangeable internal insert.
Figure 25:
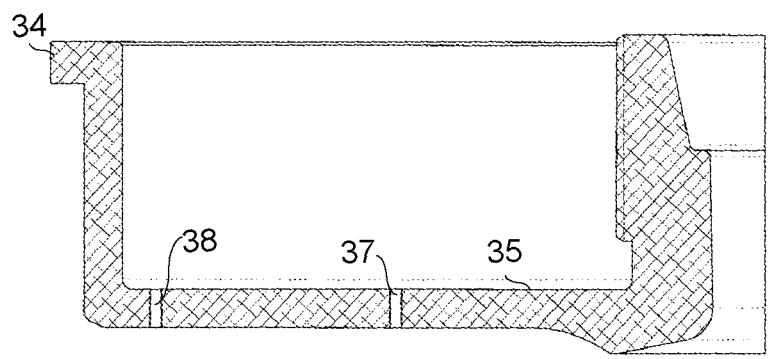
FIG. 25 is a sectional view according to line XXV-XXV of FIG. 24.

In addition, the rotating ring 7c' has a seat 13' along its upper inner edge for mounting the internal insert 14', which is in turn provided with a corresponding top peripheral flange 34, as shown in FIGS. 24-26, and is sized to fit with minimal clearance inside the rotating ring 7c'.

More specifically, the internal insert 14' has a substantially U-shaped section which in the bottom 35, that constitutes the "ceiling" of channel 9, has a circle of threaded axial through holes 36 as well as two double rows of threaded axial through holes 37, 38 respectively arranged in a radially more internal and more external position with respect to said circle 36, preferably symmetrically with respect to it. These holes 37, 38 are made along concentric arcs at two small-sized angular sectors arranged 180° apart symmetrically.

By way of example, in the specific embodiment shown in the figures, the circle of holes 36 includes sixteen equally spaced holes with M5 threads, while each series of holes 37, 38 includes thirty holes with M4 threads and an angular pitch of 1.5°, i.e. each arc extends over 45°, and the radial distance between the arcs is 75 mm.

Figure 29:
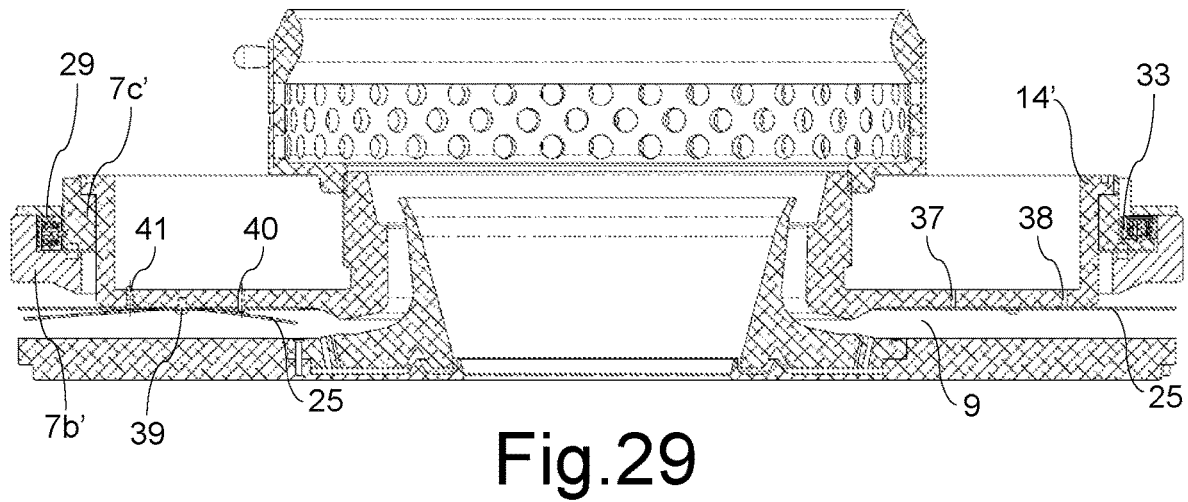
FIG. 29 is a simplified sectional view along the plane of FIGS. 27 and 28 showing an example of local adjustment.

As better illustrated in FIGS. 27-29, holes 36 receive screws 39 that fix a ring of deformable segments 25 on the ceiling of channel 9, while holes 37, 38 receive respective headless adjustment screws 40, 41 that pressing from above on segments 25 force them to partially close channel 9 so as to carry out a local adjustment of the cooling air flow.

It is obvious that also various aspects of the second embodiment of the apparatus described above can be modified and/or replaced with equivalents according to the normal knowledge of a person skilled in the art. A non-exhaustive list of these aspects includes, in addition to those already mentioned in relation to the first embodiment:

e) the number of support wheels 29 and/or centering wheels 33 may vary as long as they are always equally spaced, and of course the rotating ring 7c' would be modified accordingly;

f) the adjustment of the deformable segments 25 instead of being done manually by screwing/unscrewing screws 40, 41 could be done automatically with appropriate actuators and control systems;

g) segments 25 could be arranged only in correspondence with the adjustment sectors, so that holes 36 would not form a circle but would only be made adjacent to holes 37, 38;

h) segments 25 could extend radially only inwards or outwards with respect to the fixing holes 36, so that the two rows of holes 37 or 38 respectively would be sufficient.

Figure 30:
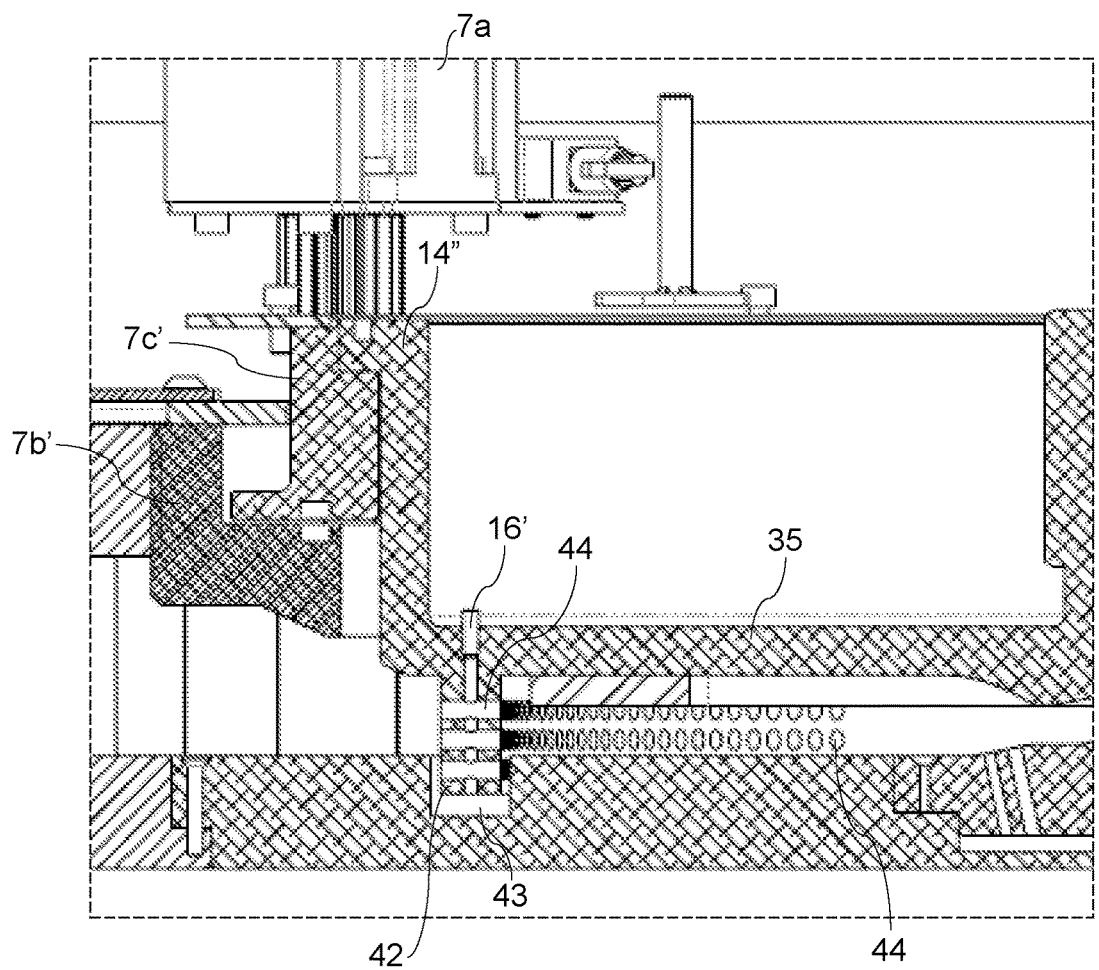
FIG. 30 is a view similar to FIG. 15 that shows a third embodiment of the device, similar to the second embodiment but with a different internal insert.

Finally, FIG. 30 illustrates a third embodiment that applies the same principle of limitation of the flow of the second embodiment from which it differs only in the way in which this limitation is achieved by means of the internal insert, while the rings 7b', 7c' remain unchanged.

More specifically, the internal insert 14" is provided with a ring 42 that extends axially downwards below the bottom 35 crossing channel 9, until it enters a corresponding groove 43 so as to form a sort of labyrinth seal. This lower ring 42 is crossed by one or more stacked circles of radial through holes 44 (three circles in the example shown) so that the cooling air flow must pass through the radial through holes 44 to reach the bubble. By adjusting the air flow through adjustment screws (not shown) screwed into axial threaded holes 16', which are made in the lower ring 42 only in the adjustment sectors, a lower flow rate is obtained in correspondence with the angular sectors that will contain the folding edges.

Note that the height of the lower ring 42 and the depth of groove 43 must be sufficient to cover the axial adjustment travel of the device on the cooling ring by means of thread 12, as mentioned above. In addition, the stacked circles of circular holes 44 illustrated in FIG. 30 could be replaced by a single circle of slots that extend axially between the first and last circles of holes 44.

Obviously, also these embodiments of the device that perform a reduction of the air flow, instead of a partial removal thereof, can operate both on the air flow coming from the primary adjustment device that passes through channel 9 and on a uniform air flow that passes through another channel, with the advantages and disadvantages indicated above.

With regard to the method of adjusting the thickness profile implemented by this device, it is necessary to take into account the problems that arise both during the measurement of the thickness profile and due to the need to synchronize the adjustment device 7 with the rest of the plant depending on the type and operating parameters of the latter, such as the extrusion and haul-off speed, the draw ratio, the angular speed of relative rotation between the head and the haul-off, the type of rotation, the distance between the head and the haul-off, etc.

The measurement of the thickness profile of the finished product must take place downstream of all film deformation operations, otherwise there is no certainty that post-measurement deformations will produce calculable effects in a reliable and repetitive manner. Therefore, only the measurement of the final thickness profile allows the correct setting of the correction elements, but it must be considered that this correction concerns an overlap of effects since it must take into account both the dispersion of the base profile characteristic of the tubular film FT in the length between the extrusion head 1 and haul-off 5, and the localized profile dispersion near the folding edges generated by the additional stretching imposed by haul-off 5.

It will be sufficient to consider the measurements and corrections made by the linear overlapping of two measurements, since each circumferential sector of the bubble subject to edge stretching is still known in its thickness before the edge is travelling on it, so that a specific software can easily take this into account.

However, more than one measuring device may be installed on the plant, in particular a first device 4 in the length between head 1 and haul-off 5, and a second device downstream of haul-off 5. In this way it will be possible to measure both the circumferential thicknesses upstream of haul-off 5 and therefore before stretching, and the final circumferential thicknesses downstream thereof. With multiple devices, the amount of edge deformation can be appreciated at each scan and in the time unit, but taking into account the angular offsets due to the distance in space of the measuring devices.

In the case of a single measuring device arranged downstream of haul-off 5, a time-lag of measurements on the same sector of the film shall be taken into account. In both cases, it is possible to know the extent of the thickness errors before and after the stretching operation and to adopt the correction strategy.

The various constructional solutions described above (partial removal or localized reduction of a fraction of the primary adjustment flow or of a uniform flow) are all suitable for solving the edge problem in the pre-stretching technique in a bubble extrusion plant. As already mentioned, they can all be traced back to a single correction method, i.e. feeding the calendar of the stretching haul-off with a tubular film FT characterized by a thickness profile suitably altered near the folding edges with a shape complementary to the non-uniformly distributed effects generated by the stretching.

However, this implies that the thickness profile detected by the measuring device 4 upstream of haul-off 5 contains a "deliberate error" in the angular sectors near the folding edges to compensate for the subsequent effect of the stretching downstream of haul-off 5. As a consequence, in calculating the correction of the base profile to be applied in the primary adjustment it is necessary to take into account the presence of such a "deliberate error" which does not need to be corrected, for example by discarding the current reading of the angular sectors concerned and by using instead the last reading made on those sectors before the intervention of the localized adjustment device.

The rotation of the rotating ring 7c, 7c' must be performed taking into account the synchronization problems mentioned above resulting from the relative rotation between head 1 and haul-off 5, and also which of the two elements is rotating/oscillating.

A phenomenon to consider is the torsion of the bubble along its longitudinal axis due to the relative rotation motion between head 1 and haul-off 5, due to which a particle of molten material flowing from the head in an angular position defined by a plane passing through that point and the axis of the bubble, in the motion from head 1 to haul-off 5 does not remain on that plane but follows a spiral path S (FIG. 1). For example, if it takes 30 seconds for the particle of molten material to pass from head 1 to haul-off 5 that rotates at an angular speed of 36°/min, the theoretical angular offset is 18°.

The real value of this offset will be however lower because the bubble is made of a soft material that does not guarantee a complete dragging, and has a deformation concentrated in the lower part which is the softer and furthest from the mechanical constraint of haul-off 5, this deformation being greater in the case of a rotating haul-off than in the case of a rotating head. The position of the measuring sensor, whether between head 1 and haul-off 5 or downstream of haul-off 5, is affected by this offset and therefore a proper adjustment of the thickness profile is based on the correct estimate of the offset regardless of whether the haul-off is provided with additional stretching elements.

Starting from a stationary production situation at steady speed with known starting positions of the parts in relative rotation, it is necessary to consider a transient phase and a phase at steady speed every time the production speed is changed and/or the rotation motion is activated or reversed.

In the case of fixed head 1 and rotating haul-off 5, the adjustment device 7 shall activate its rotation well in advance of the rotation of haul-off 5, and the speed of rotation of the adjustment device 7 shall be calculated on the basis of the speed of rotation of haul-off 5 at steady speed and of the transit time of a cross-section of the bubble from head 1 to the calender of haul-off 5, including any starting ramps. The rotation of haul-off 5 must in fact be activated when the section of the bubble coming out of head 1 at the moment of activation of the rotation of device 7 has reached the section of the calender.

The speeds of rotation of the adjustment device 7 and of haul-off 5 shall be kept synchronized until the reversal command in the case of an oscillating haul-off, or until further notice in the case of a rotating haul-off. At the reversal command, the adjustment device 7 will reverse its rotation while the reversal of the movement of haul-off 5 will take place with a delay equal to the time required for the complete reversal of the spiral path S, taking into account any transition ramps and possible stopping times.

In the case of the described and illustrated device, the rotating ring 7c, 7c' will rotate relative to the static ring 7b, 7b' in which it is housed according to angular sectors as extensive as the extension of the rotation/oscillation of haul-off 5. In particular, ring 7c, 7c' can oscillate by overlapping substantially along all 360° of ring 7b, 7b' since the folding edges of the film can rotate along the entire circumference of the bubble, even if the oscillation will actually be slightly less due to the actual angular offset between device 7 and haul-off 5.

In case of rotating head and fixed haul-off, the operating logic is completely analogous with the only difference that the edges of the film are fixed in the space, being physically folded always in the same position by the calendar of haul-off 5, therefore the position of the edges stabilizes after every starting/reversing transition. Therefore, even if head 1 rotates indefinitely or oscillates over large angular sectors together with the primary adjustment device mounted on it, the oscillation of the localized adjustment device 7, which is bound to the cooling ring 2 and not to the primary adjustment device, will be limited to a small angular arc. This arc will be equal to the simple effect of the dragging delay spiral of the bubble due to the relative motion between head 1 and haul-off 5, with the two adjustment sectors of the rotating ring 7c, 7c' that oscillate around the axis of the calendar of haul-off 5.

Here, too, the criteria for controlling offset, activation of the rotation, delay and synchronism of the commands remain unchanged.

It is clear that the above-described and illustrated embodiments of the device according to the invention are only examples susceptible to numerous variations, in addition to those already mentioned above. In particular, the exact number, size, shape and arrangement of the air passages 11, 15, 16, 17 of the first embodiment can be varied according to the needs of the case, as long as they are able to provide the required amount and precision of adjustment. Similarly, the same applies to adjustment elements 25, 37, 38 of the second embodiment and to adjustment elements 16', 42, 43, 44 of the third embodiment.

The invention claimed is:

1. An apparatus for the production of a blown tubular film (FT) comprising an extrusion head, a cooling ring containing a primary device for adjustment of a thickness profile of said tubular film (FT) and means for localized thickness adjustment at strips adjacent to folding edges resulting from flattening of the tubular film (FT), a haul-off that draws and flattens the tubular film (FT) into a flattened film (FA), the extrusion head and said haul-off being relatively rotatable to produce a rotating/oscillating relative motion therebetween, means suitable to perform a stretch of the flattened film (FA), a final thickness profile measuring device that measures a final thickness profile of the flattened film (FA), as well as a control unit operatively connected to said means for the localized thickness adjustment, to said primary adjustment device, to said final thickness profile measuring device and to the extrusion head and the haul-off so as to coordinate the rotating/oscillating relative motion between the extrusion head and the haul-off and to carry out a feedback adjustment of the primary adjustment device on the basis of data of the final thickness profile measuring device, wherein the means for the localized thickness adjustment comprise an independent localized adjustment device provided with adjustment elements formed in angular sectors of limited extension symmetrically arranged 180° apart, said independent localized adjustment device comprising a rotating ring that performs a rotating adjustment of a flow rate of a cooling air stream, which can be a stream coming from the primary adjustment device or a separate uniform stream, said control unit being operatively connected to the independent localized adjustment device so as to coordinate a motion of said rotating ring with the relative motion between the extrusion head and the haul-off and to carry out the feedback adjustment of the primary adjustment device on the basis of the data of the final thickness profile measuring device taking into account the effect of the independent localized adjustment device;

wherein the independent localized adjustment device includes a static ring that is secured to the cooling ring, and shaped to mate with the rotating ring that is superposed thereon, as well as a driving mechanism that drives the rotating ring and is secured on top of the cooling ring; and wherein the rotating adjustment of the flow rate of the cooling air stream is performed through ducts and cavities formed in the static ring and in the rotating ring and provided with adjustment means located on the latter, so as to withdraw and disperse in a controlled manner a fraction of the cooling air, the dispersion of said air fraction taking place outside of the tubular film (FT) through release holes.

2. The apparatus according to claim 1, wherein the static ring has a top channel with a U-shaped cross-section that on a bottom has one or more concentric circles of axial through holes in communication with a cooling air channel where the cooling air passes, while the rotating ring has a bottom shape matching said top channel so as to form with the static ring a sliding coupling whereby a bottom face of the rotating ring closes said axial through holes except at said two angular sectors of limited extension, symmetrically arranged 180° apart, in which said bottom face is provided with a plurality of cavities having a radial extension sufficient to cover all said circles of axial through holes and an angular extension sufficient to cover an axial through hole, an axial hole extending between each of said cavities and a top face of the rotating ring, and a radial hole extending between each of said axial holes and an internal face of the rotating ring, the portion of each axial hole above said radial hole and/or the portion of each radial hole to the inside of said axial hole being provided with a thread.

3. The apparatus according to claim 1, wherein the rotating ring is provided at the top with a crown gear that is engaged by a pinion driven by an electric motor, optionally a stepping motor.

4. The apparatus according to claim 1, wherein the rotating ring is provided at the top with a reference peg capable to trigger a microswitch integral with the driving mechanism.

5. An apparatus for the production of a blown tubular film (FT) comprising an extrusion head, a cooling ring containing a primary device for adjustment of a thickness profile of said tubular film (FT) and means for localized thickness adjustment at strips adjacent to folding edges resulting from flattening of the tubular film (FT), a haul-off that draws and flattens the tubular film (FT) into a flattened film (FA), the extrusion head and said haul-off being relatively rotatable to produce a rotating/oscillating relative motion therebetween, means suitable to perform a stretch of the flattened film (FA), a final thickness profile measuring device that measures a final thickness profile of the flattened film (FA), as well as a control unit operatively connected to said means for the localized thickness adjustment, to said primary adjustment device, to said final thickness profile measuring device and to the extrusion head and the haul-off so as to coordinate the rotating/oscillating relative motion between the extrusion head and the haul-off and to carry out a feedback adjustment of the primary adjustment device on the basis of data of the final thickness profile measuring device, wherein the means for the localized thickness adjustment comprise an independent localized adjustment device provided with adjustment elements formed in angular sectors of limited extension symmetrically arranged 180° apart, said independent localized adjustment device comprising a rotating ring that performs a rotating adjustment of a flow rate of a cooling air stream, which can be a stream coming from the primary adjustment device or a separate uniform stream, said control unit being operatively connected to the independent localized adjustment device so as to coordinate a motion of said rotating ring with the relative motion between the extrusion head and the haul-off and to carry out the feedback adjustment of the primary adjustment device on the basis of the data of the final thickness profile measuring device taking into account the effect of the independent localized adjustment device;

wherein the independent localized adjustment device includes a static ring that is secured to the cooling ring, and shaped to mate with the rotating ring that is superposed thereon, as well as a driving mechanism that drives the rotating ring and is secured on top of the cooling ring; and wherein the rotating adjustment of the flow rate of the cooling air stream is performed through adjustable means capable of reducing the flow area in a cooling air channel, said adjustable means being integral with the rotating ring.

6. The apparatus according to claim 5, wherein the static ring supports the rotating ring, which in turn carries an internal insert and a stabilizer mounted on the latter, through a sliding coupling achieved through a plurality of support wheels and centering wheels, said wheels being optionally equally spaced both with respect to the wheels of their own type and with respect to the wheels of the other type.

7. The apparatus according to claim 6, wherein the adjustable means capable of reducing the flow area in the cooling air channel are arranged below the internal insert and extend into said channel.

8. The apparatus according to claim 7, wherein the adjustable means capable of reducing the flow area in the cooling air channel are deformable segments secured to a ceiling of said channel and pressed from above through adjustment screws screwed into corresponding axial through holes formed on a bottom of the internal insert.

9. The apparatus according the claim 7, wherein the adjustable means capable of reducing the flow area in the cooling air channel are adjustment screws screwed into corresponding axial through holes formed on a bottom of the internal insert in correspondence with a ring that extends axially downwards under said bottom passing through said channel until it enters a corresponding groove so as to form a labyrinth seal, said bottom ring being crossed by one or more stacked circles of radial through holes whereby the cooling air stream must pass through said radial through holes in order to reach the tubular film (FT).

10. The apparatus according to claim 5, wherein the rotating ring is provided at the top with a crown gear that is engaged by a pinion driven by an electric motor, optionally a stepping motor.

11. The apparatus according to claim 5, wherein the rotating ring is provided at the top with a reference peg capable to trigger a microswitch integral with the driving mechanism.

* * * * *